US005564117A

United States Patent [19]
Lentz et al.

[11] Patent Number: 5,564,117
[45] Date of Patent: *Oct. 8, 1996

[54] COMPUTER SYSTEM INCLUDING A PAGE PRINTER CONTROLLER INCLUDING A SINGLE CHIP SUPERCALAR MICROPROCESSOR WITH GRAPHICAL FUNCTIONAL UNITS

[75] Inventors: Derek J. Lentz, Los Gatos; Johannes Wang, San Mateo; Trevor Deosaran, Sunnyvale; Linley M. Young, San Diego; Kian-Chin Yap, San Jose; Le T. Nguyen, Monte Sereno, all of Calif.; Makoto Matsubayashi, Suwa, Japan; Te-Li Lau, Palo Alto, Calif.

[73] Assignee: Seiko Epson Corporation, Tokyo, Japan

[*] Notice: The term of this patent shall not extend beyond the expiration date of Pat. No. 5,394,515.

[21] Appl. No.: 468,083

[22] Filed: Jun. 6, 1995

Related U.S. Application Data

[63] Continuation of Ser. No. 383,015, Feb. 3, 1995, Pat. No. 5,559,951, which is a continuation of Ser. No. 267,646, Jun. 28, 1994, Pat. No. 5,394,515, which is a continuation of Ser. No. 817,813, Jan. 8, 1992, abandoned, which is a continuation of Ser. No. 726,929, Jul. 8, 1991, abandoned.

[51] Int. Cl.⁶ ..................................................... G06F 15/16
[52] U.S. Cl. .......................... 395/163; 395/110; 395/101; 395/164
[58] Field of Search ..................................... 395/110, 115, 395/116, 101, 162–166, 150, 152; 358/443–448, 404, 468

[56] References Cited

U.S. PATENT DOCUMENTS

| | | | |
|---|---|---|---|
| 4,648,045 | 3/1987 | Demeetrescu | 364/518 |
| 4,841,453 | 6/1989 | Finlay et al. | 395/110 |
| 5,051,925 | 9/1991 | Kadono et al. | 395/110 |
| 5,394,515 | 2/1995 | Lentz et al. | 395/115 |

FOREIGN PATENT DOCUMENTS

354024A3  7/1990  European Pat. Off. .

OTHER PUBLICATIONS

"Printer Using Direct Memory Access to Reduce Communications Bandwidth", *IBM Technical Disclosure Bulletin*, vol. 33, No. 8, p. 485.

Primary Examiner—Kee M. Tung
Attorney, Agent, or Firm—Sterne, Kessler, Goldstein & Fox P.L.L.C.

[57] ABSTRACT

A VLSIC page printer controller includes an instruction processor which responds to a host computer and a printer video processor for accessing data from memory under the control of the instruction processor and serializing data for transfer to a printer through a video port. An I/O interface interconnects the printer controller with an I/O bus to which is connected a host computer, memory devices, and other peripheral devices. An internal memory interface connects the printer controller to memory, and the printer video processor is provided with direct memory access (DMA). Data and instruction caches and an instruction ROM are provided on-chip. A RISC instruction processing unit includes as an integral part thereof the special function, circuits of orthogonal rotator, bit/byte mirror, and pixel modification.

14 Claims, 15 Drawing Sheets

PRIMARY MODE UART 0 OUTPUT TIMING

PRIMARY MODE UART 0 INPUT TIMING

COMPUTER SYSTEM INCLUDING A PAGE PRINTER CONTROLLER INCLUDING A SINGLE CHIP SUPERCALAR MICROPROCESSOR WITH GRAPHICAL FUNCTIONAL UNITS

CROSS-REFERENCE TO RELATED APPLICATION

This is a continuation of patent application Ser. No. 08/383,015, filed Feb. 3, 1995, now U.S. Pat. No. 5,559,951, which is a continuation of patent application Ser. No. 08/267,646, filed Jun. 8, 1994, now U.S. Pat. No. 5,394,515, which is a continuation of patent application Ser. No. 07/817,813, filed Jan. 8, 1992, now abandoned, which is a continuation of patent application Ser. No. 07/726,929, filed Jul. 8, 1991, now abandoned.

This application is related to the following patent applications:

"High Performance RISC Microprocessor Architecture" patent application Ser. No. 07/817,810 filed Jan. 8, 1992, which is a continuation of patent application Ser. No. 07/727,006 filed Jul. 8, 1991, now abandoned.

"Microprocessor Architecture Capable of Supporting Multiple Heterogeneous Processor", patent application Ser. No. 07/726,893, filed Jul. 8, 1991, now U.S. Pat. No. 5,440,752, which issued on Aug. 8, 1995.

BACKGROUND OF THE INVENTION

This invention relates generally to controllers for printers such as laser printers, and more particularly the invention relates to a processor controller for a printer which can be implemented in a very large scale integrated circuit (VLSIC) semiconductor chip.

A page printer controller operates under control of a host computer in providing the video signals for a printer such as a laser printer. The functions of transforming data to a display coordinate system, clipping objects to conform to an image window, and scaling the window to the viewpoint of the destination display device are discussed in U.S. Pat. No. 4,449,201 for "Geometric Processing System Utilizing Multiple Identical Processors" and in U.S. Pat. No. 4,648,045 for "High Speed Memory and Processor System for Raster Display," as applied to graphics display.

Disclosed in the above-referenced co-pending patent applications are a unique single chip RISC processor and a memory control unit operable therewith to permit multiprocessing capability. The present invention is directed to a printer controller architecture which can utilize the RISC processor architecture and interface with the memory control unit. The controller includes peripheral components such as a printer video processor (PVP), UART ports, an I/O bus interface, a DMA controller, a firmware ROM, and memory interface. The major functions of the printer controller are to communicate with a host computer, transform data into image data (coordinate transformation, clipping, scaling, and rasterization) interface with other components of the print engine (e.g. laser printer), and run diagnostics. Known in the prior art is a single chip unit (Intel i860) including a RISC processor and special graphics hardware. However, the graphics hardware is outside of the RISC processor and not physically and functionally integrated therein.

SUMMARY OF THE INVENTION

Accordingly, an object of the invention is a printer controller which can be implemented in a single VLSIC semiconductor chip.

Another object of the invention is a printer controller which can utilize a RISC microprocessor architecture as disclosed in the above co-pending application.

A feature of the invention is the provision of special function circuits within a RISC microprocessor which are used by special graphics functions and integrated into the processor in the same way as other function units.

Another feature of the invention is a printer video processor having efficient and integrated direct memory access.

The invention and objects and features thereof will be more readily apparent from the following detailed description and appended claims when taken with the drawings.

DETAILED DESCRIPTION OF ILLUSTRATIVE EMBODIMENTS

Figure 1:
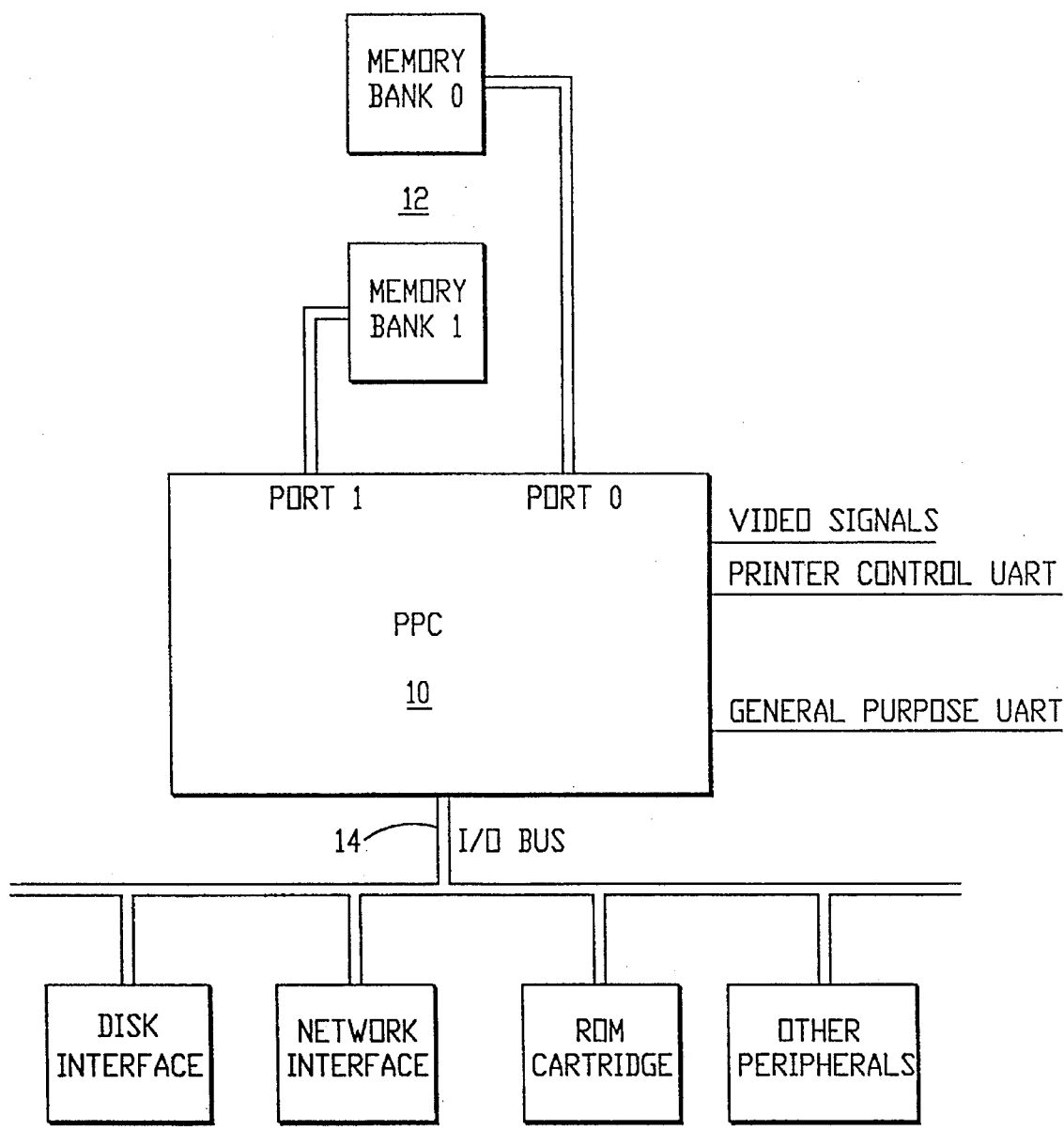
FIG. 1 illustrates the PPC system block diagram.

The page printer controller (PPC) in accordance with the invention can be implemented using the RISC processor and memory controller described in the copending applications, and the printer controller described herein for controlling a page printer-engine is based thereon. Reference to "laser" printers may be generalized to refer to any page type printer with a similar interface.

Referring now to the drawings, FIG, 1 illustrates the general system block diagram of the PPC 10 as it interfaces with a two-way interleaved memory array 12 including memory bank 0 and optional memory bank 1, an I/O bus 14 for communicating with a host computer and various peripherals, a special purpose (printer control) UART, a general purpose UART, and providing the video signals to the raster scan laser of the printer. The PPC unit 10 is further illustrated in the block diagram of FIG. 2 and includes a RISC CPU or instruction processing unit (IPU) 20 which communicates directly with an optional data cache 22, an optional instruction cache 24, and an optional RISC instruction ROM 26. The microprocessor unit 20 further communicates with memory through the memory interface unit 28 having one or more memory ports.

As noted above, the microprocessor unit 20 in the preferred embodiment is based on the RISC chip disclosed in co-pending patent application Ser. No. 07/817,810, and the memory interface disclosed in patent application Ser. No. 07/726,893, now U.S. Pat. No. 5,440,752, which issued on Aug. 8, 1995 both of which are incorporated by reference. In addition the instruction processing unit has several special functional units in support of the printer video processor 30 including a pixel modification datapath, an orthogonal rotator, and a bit/byte mirror.

Figure 3:
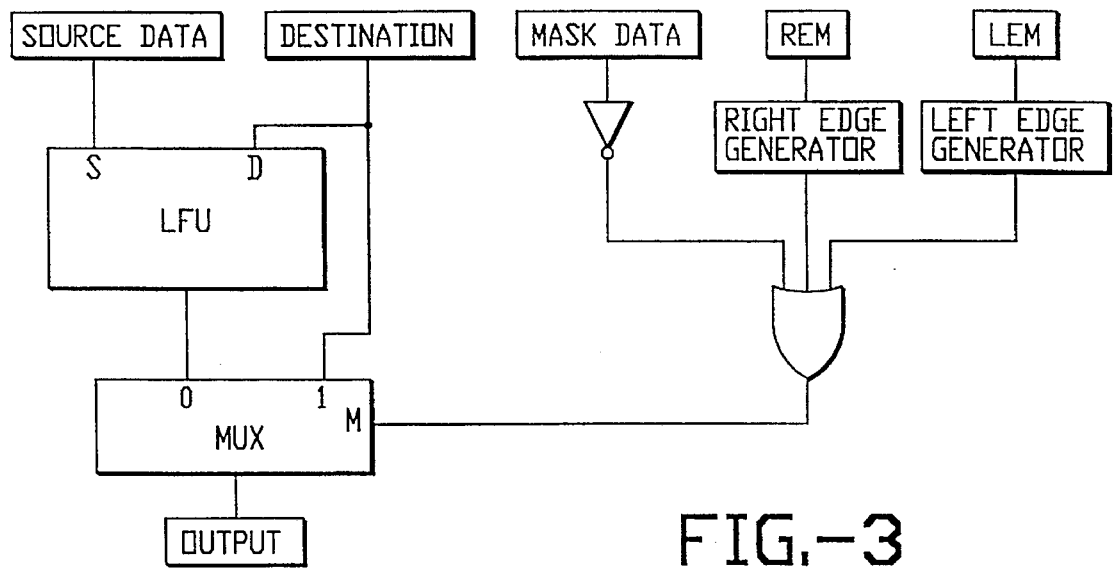
FIG. 3 illustrates pixel modification datapath.

FIG. 3 is a functional block diagram of the pixel modification datapath in which pixels are modified by graphics instructions. The pixels are modified by graphics instructions as shown in the datapath. The destination and source are bit-wise combined by the LFU. The combined results are passed into the output MUX and either the original destination or the modified destination is passed to the output. The computations are bit-wise, so that the selection of the modified or unmodified destination is made by the LEM, REM and Mask Data of the individual datapath bit. The LEM and REM are 5 bit numbers which define the left and right edge of the bit range to be modified, and are processed by edge generator logic to expand into bit fields (the left mask and right mask) which are used to control the multiplexer. The left mask, the right mask and the Mask Data are bit-wise logically ORed, such that all bits must be set to 0 for the destination bit to be changed. The circuit of FIG. 3 is a "bit slice" representation of the graphics pixel modification datapath. The LFU function code is held in a processor state register.

The destination is always combined with a "source". The source may be predetermined data or copied from a memory bit map. The source and destination may be combined with any of the 16 possible combinations of 2 binary bits. When a mask is used, the mask restricts the pixels modified to those within the mask image which are set.

Figure 4:
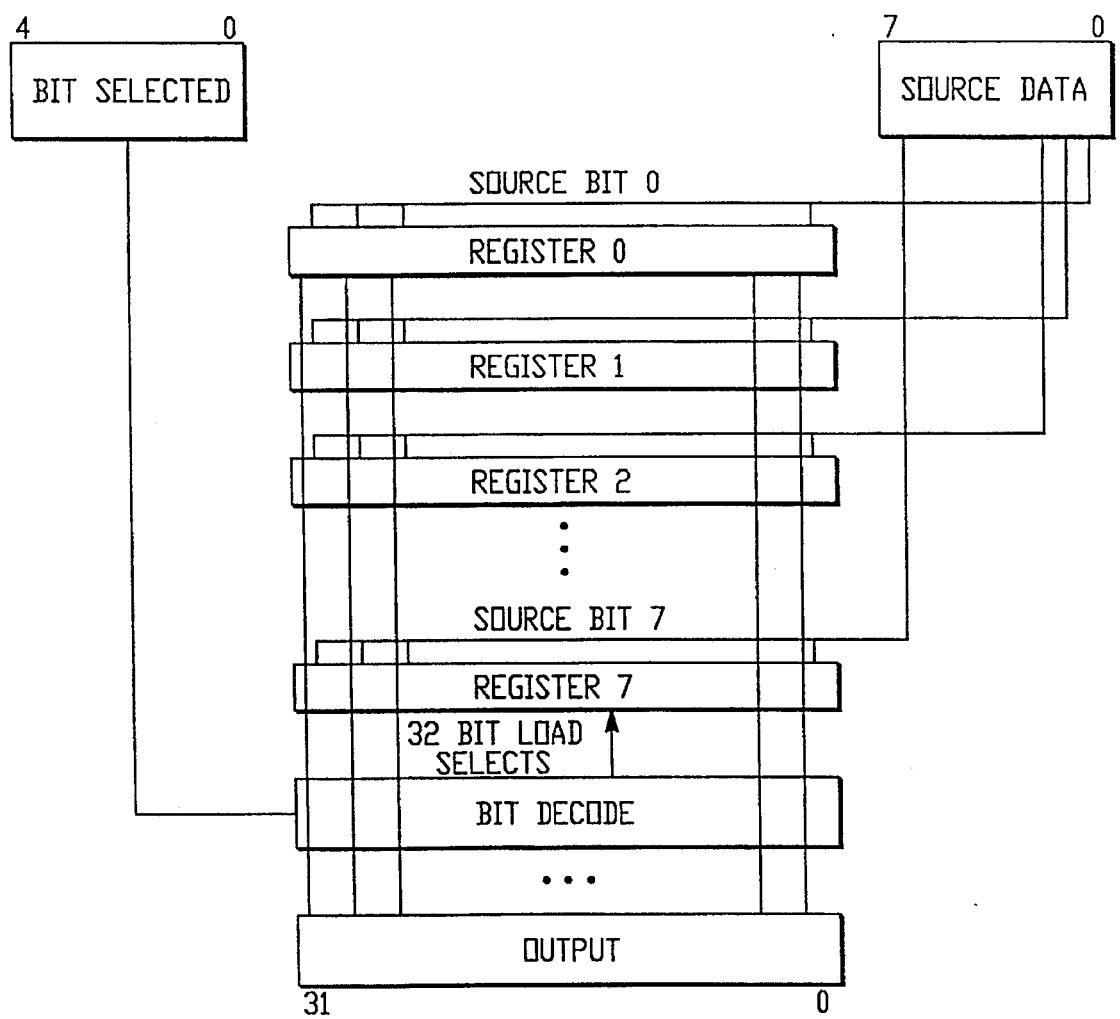
FIG. 4 illustrates the orthogonal rotator.

FIG. 4 is a functional block diagram of the orthogonal rotator which is used to assemble blocks of orthogonally (90 or 270 degree) rotated bitmap data. The low byte of the source data is written to a bit of the 8 registers held in the unit. Up to 32 bytes are written to fill up the internal words and the orthogonally rotated data is then written to memory or used by the processor. If the words are read out from low to high register address, the rotation is 90 degrees, while reading the registers out from high to low register address rotates the data by 270 degrees.

FIG. 4 shows the basic operation of the logic. The source is loaded with 8 bits. Bit 0 is passed to all 32 bits of register 0. Bit 'n' is passed to all 32 bits of register 'n'. The bit selected is used by the bit decode to select the bit within the 8 words to be modified. In this way, one bit of each register is always loaded by one bit from the source. The data in each word is available for reading at any time. In addition, all words may be pre-loaded directly through "move" instructions and all registers may be cleared as a block, simultaneously, for initialization purposes, The orthogonal rotator instructions consist of: move to and from A or B registers, preset rotator and rotate byte orthogonally. Preset orthogonal rotator sets the values of all bits in the orthogonal registers with one instruction. The instruction has one parameter "level". This 8 bit parameter loads 1 bit into all bits of each of the 8 orthogonal registers. Bit <0> is loaded into all bits of orthogonal register 0, bit <n> is loaded into all bits of register n, etc. Rotate byte orthogonally performs the orthogonal rotation, described above on the low order byte of data from a general register. Rotate byte orthogonally has 2 parameters: the register holding the byte of data and the register holding the bit selected. The data from the registers are truncated to 8 and 5 bits, respectively.

Figure 5:
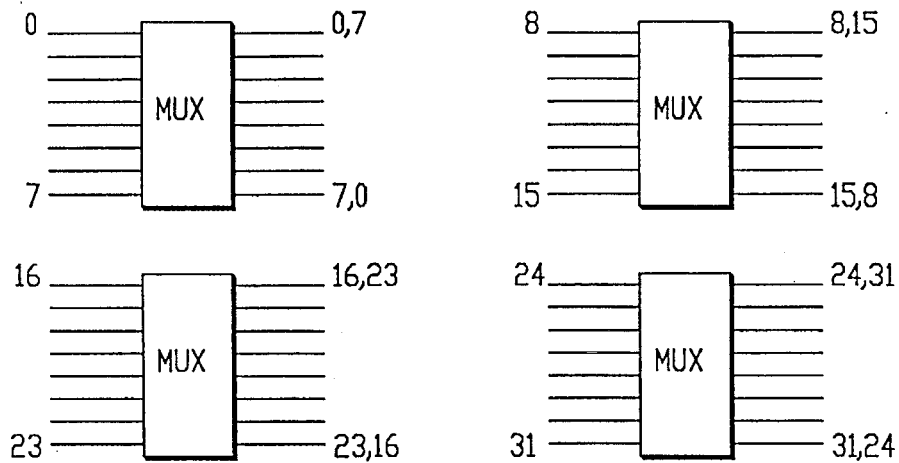
FIG. 5 illustrates bit/byte mirror.

FIG. 5 illustrates the bit/byte mirror which consists of four multiplexers (MUX) each of which receives eight bit bytes and outputs the bits in either the same order or in reverse order (mirrored) in accordance with the following table:

| Input Bit: | Output Bit: |
|---|---|
| 0 | 7 |
| 1 | 6 |
| 2 | 5 |
| 3 | 4 |
| 4 | 3 |
| 5 | 2 |
| 6 | 1 |
| 7 | 0 |
| 8 | 15 |
| 9 | 14 |
| 10 | 13 |
| 11 | 12 |
| 12 | 11 |
| 13 | 10 |
| 14 | 9 |
| 15 | 8 |
| 16 | 23 |
| 17 | 22 |
| 18 | 21 |
| 19 | 20 |
| 20 | 19 |
| 21 | 18 |
| 22 | 17 |
| 23 | 16 |
| 24 | 31 |
| 25 | 30 |
| 26 | 29 |
| 27 | 28 |
| 28 | 27 |
| 29 | 26 |
| 30 | 25 |
| 31 | 24 |

After the bits have been mirrored within a word, the word can be written back to memory, one byte at a time, or the bytes can be reordered using a barrel shifter circuit. The bit mirror instruction reads the source word from a register and writes the mirrored contents back to the destination register.

The mirroring and orthogonal rotation of bitmaps may be performed with hardware support. Two hardware functional units are provided which allow firmware and software to perform time consuming tasks relatively quickly. The bit-mirror unit mirrors all of the bits within each byte of the word loaded into it. The bytes may then be rearranged, if desired, by the use of shift instructions such as extract byte and merge byte. 180 degree rotations may be performed by this unit in conjunction with the standard shifter functions.

The orthogonal rotator unit places the low order byte of a word in a selectable bit of registers. One bit is placed in each register. The effect is that the contents of the 8 registers ends up being a 32 bit ×8 word block of bits which have been orthogonally rotated. The bit-mirror unit is provided to support the mirroring of bits within memory, for orthogonal rotations of 180°. The unit swaps the bits within all bytes of the word passed through it. For convenience the bit-mirror unit is integrated into the pixel modification datapath.

Figure 6A:
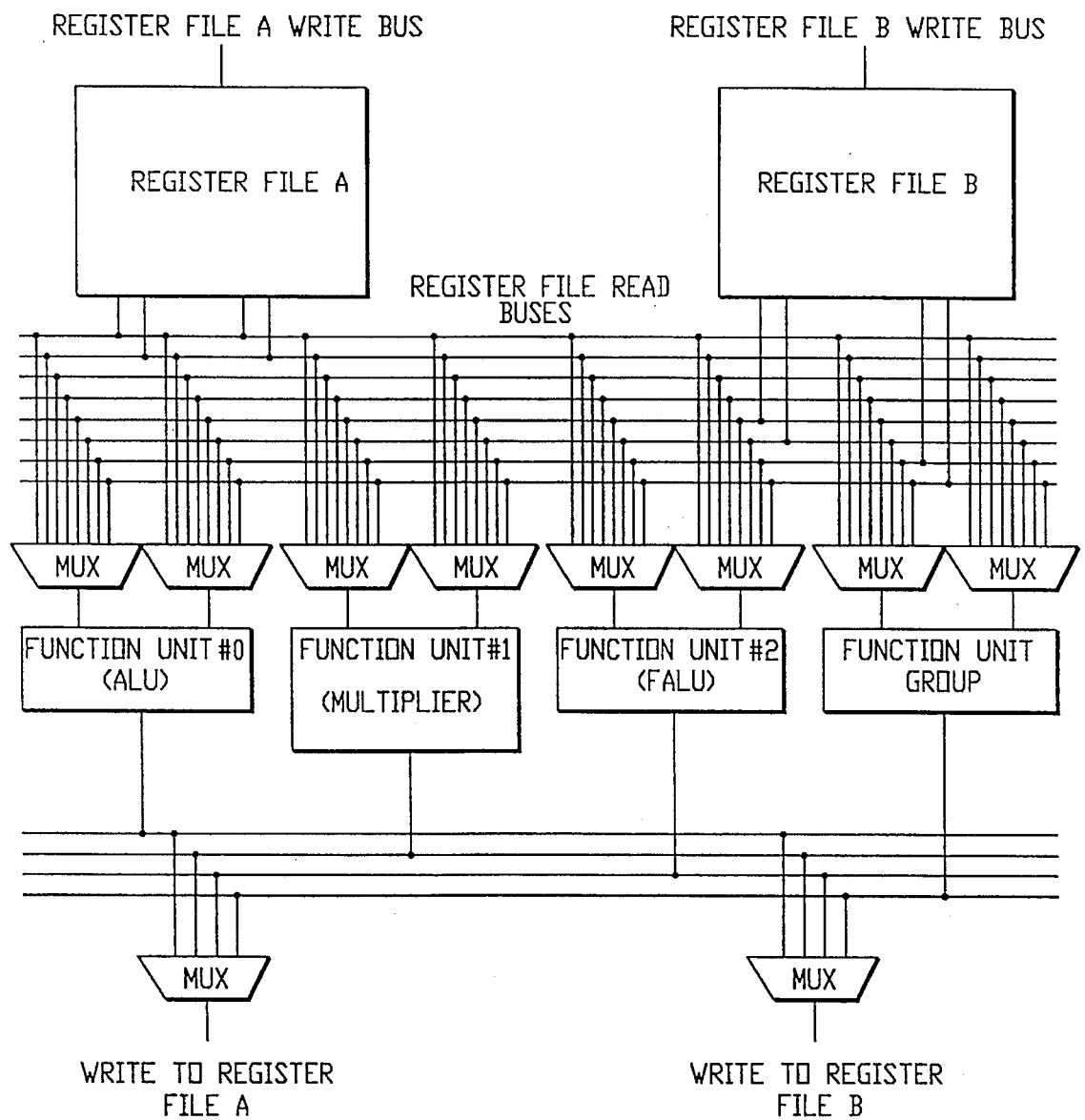
FIGS. 6A and 6B illustrate the integration of the special function circuitry of FIGS. 3–5 into the RISC processor datapath.
Figure 6B:
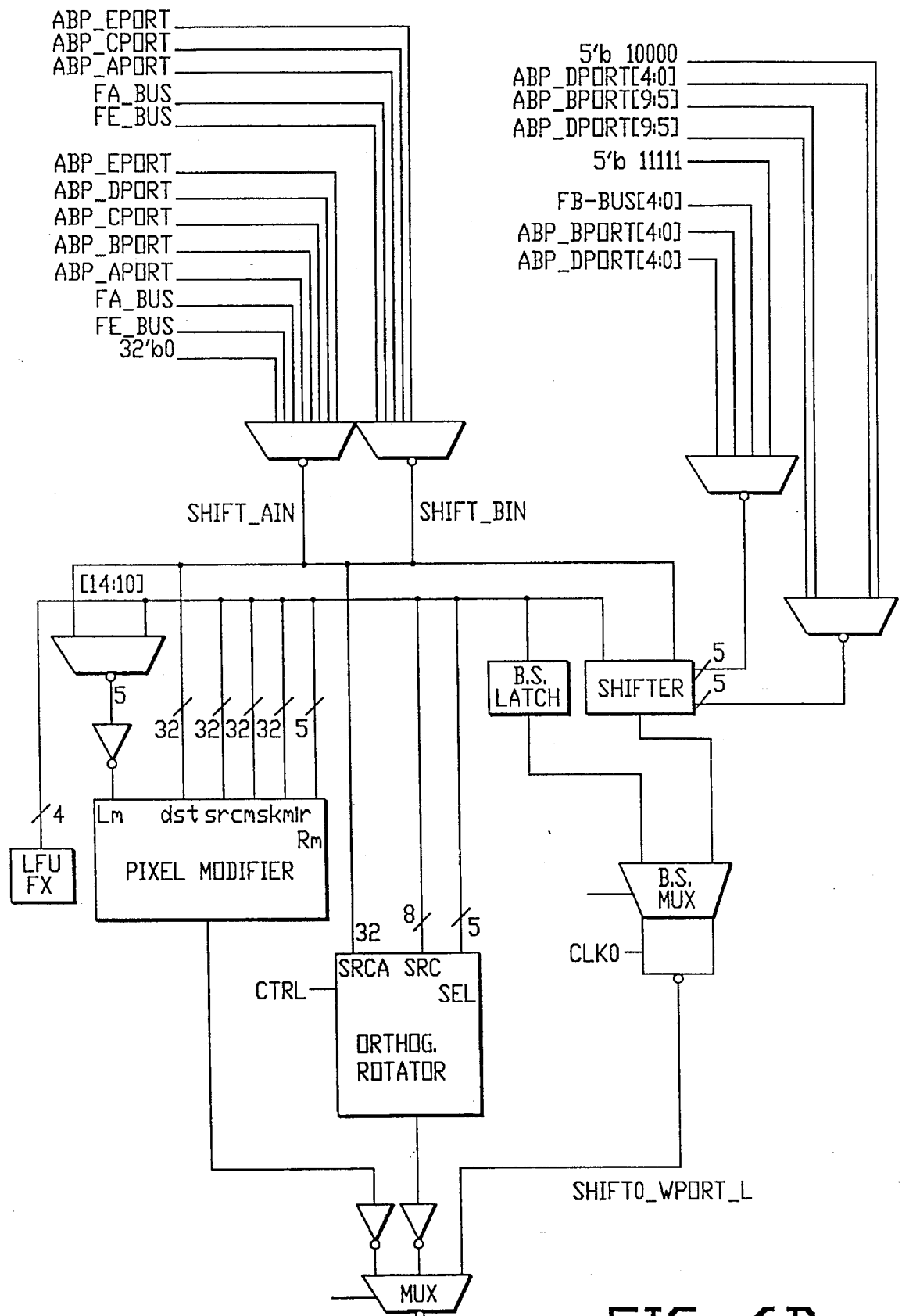

FIGS. 6A and 6B illustrate the integration of the special function circuitry of FIGS. 3–5 into the IPU. The special function circuits may be integrated as function units or within function unit groups. In FIG. 6A, the circuitry is identified as a Function Unit (Group) and is interconnected with register files A and B through MUXes just as the other Function Units (e.g. ALU, Multiplier, FALU) are interconnected. FIG. 6B further illustrates the interconnection of the source data MUXes and the control signal MUXes with the orthogonal Rotator, Pixel Modifier, and Mirror.

The graphics function units are Completely integrated into the RISC IPU. The function units are used by special graphics instructions, which are executed in exactly the same way as other RISC instructions. The RISC core is capable of "super scaler" operation, where more than one instruction may be executed and/or completed per cycle. The graphics function units are scheduler by the schedule in the same way as the other, more standard, function units, such as the ALU's or multipliers. The orthogonal rotator and pixel modification units contain internal "state" information, which must be maintained during IPU context switches. These state registers are handled in the same way as other processor state information (e.g. divider quotient and remainder registers) through special register move instructions between the register files and the function units. The function units are available to the A and B IPU register files symmetrically through the same set of buses as the shifter function unit.

Printer Video Processor

Figure 2:
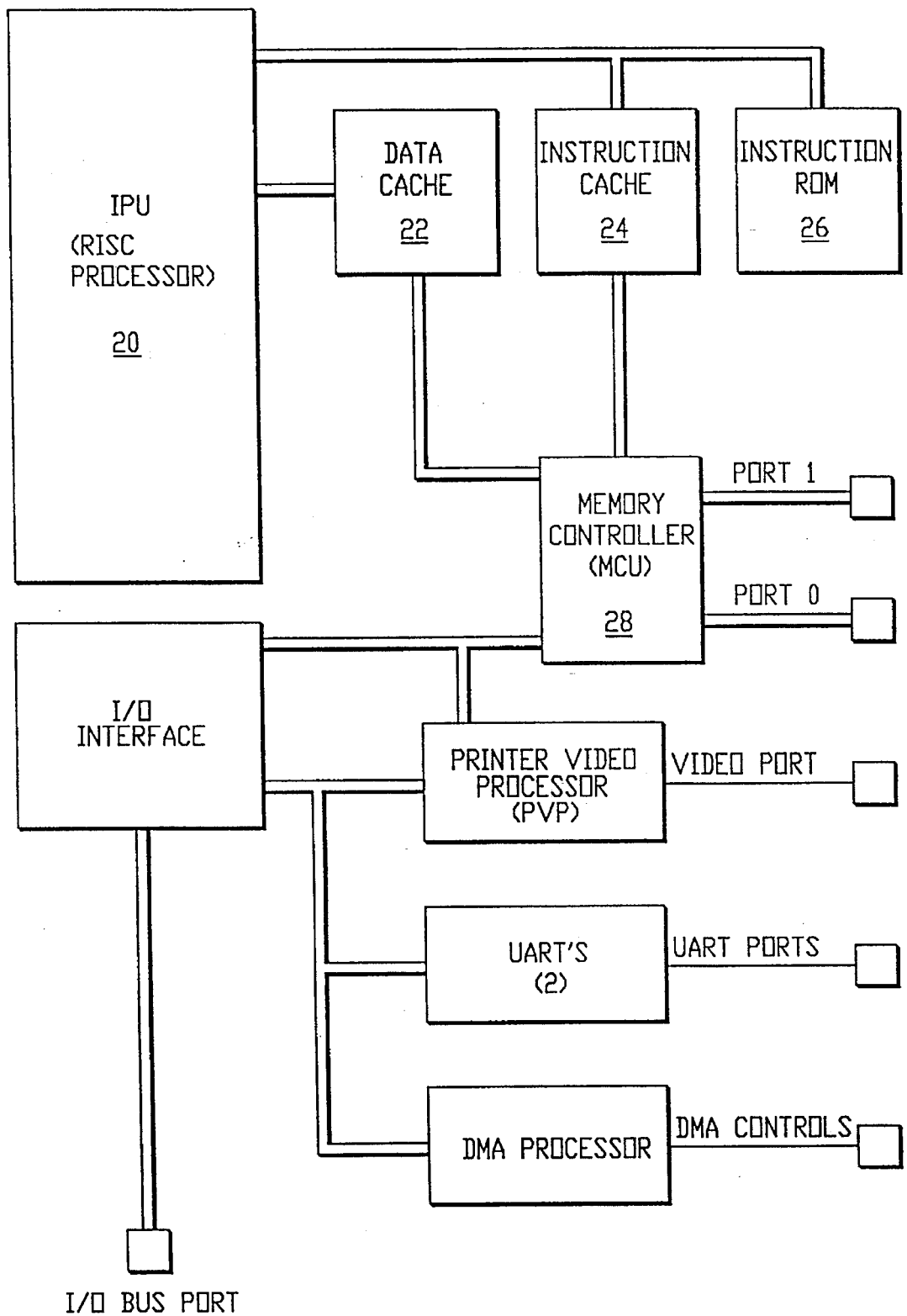
FIG. 2 illustrates the PPC block diagram.
Figure 7:
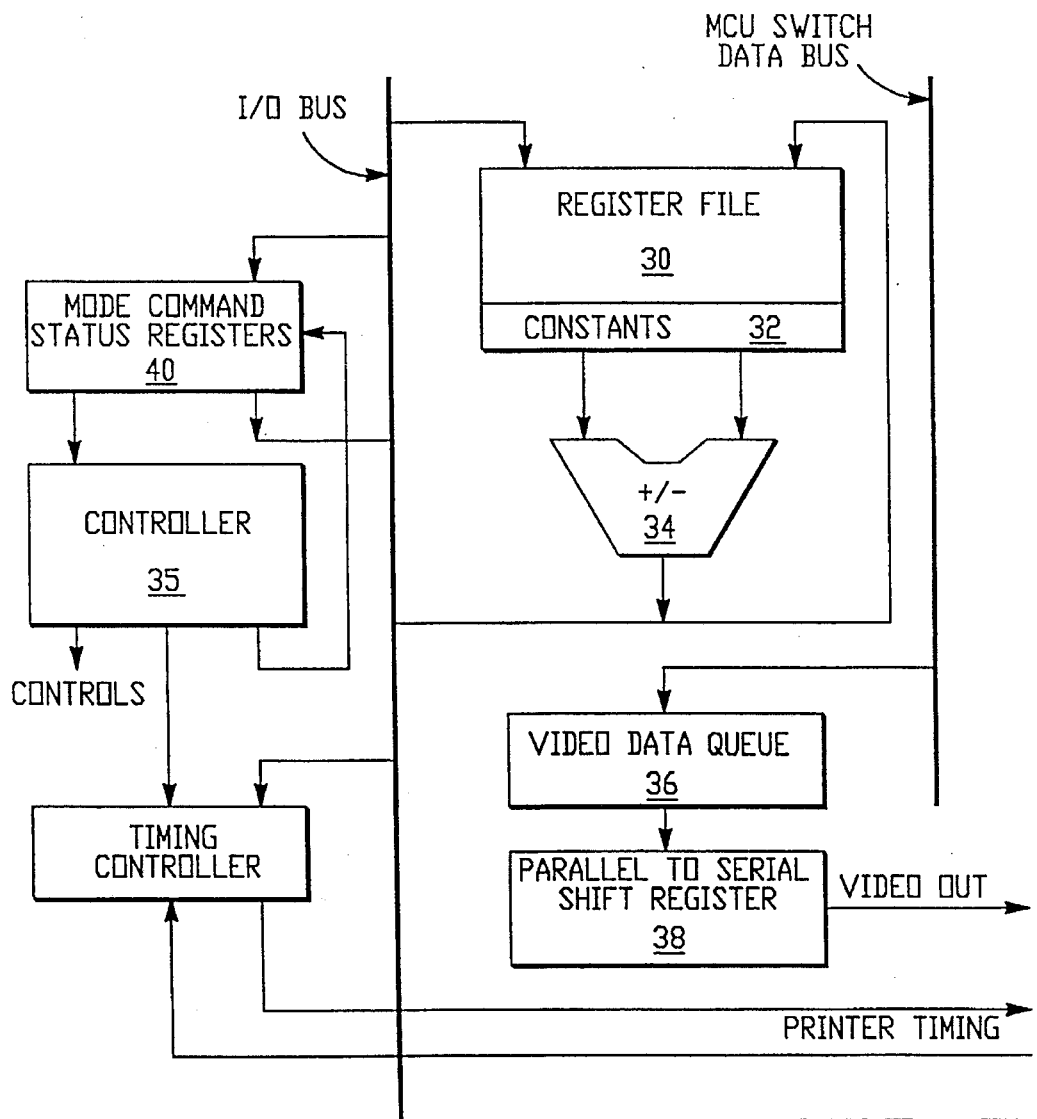
FIG. 7 illustrates video processor block diagram.

The printer video processor (PVP) 28 of FIG. 2 is further illustrated in the functional block diagram of FIG. 7. The PVP generates timing signals, performs scan data fetches and scan data serialization, and provides print engine synchronization as well as scan status and interrupt generation. Most of the circuitry is clocked by the system clock; however, the serializer and some control logic are clocked by another clock known as the print engine video clock (Wclk).

The video register file 30 contains registers used to generate timing and memory addresses. The registers may be read and written by the main system processor. The following registers reside in the video register file:

| Register: | Purpose: |
| --- | --- |
| Base | Frame buffer starting address (byte address) |
| PBase | Previous base register (band buffer mode) |
| X_max | Width of frame buffer scan, in bytes |
| Y_step | Memory address increment (see discussion), in bytes |
| Y_max | Number of scans in frame |
| T_margin | Number of scans at the top of the frame |
| Bsize | Band buffer size in lines |
| V_int | Vertical interrupt scan number |
| Base_current | Current base register (internal use) |
| Current | Current scan memory address (internal use) |
| X_current | Current X address within scan (internal use) |
| Y_current | Current scan number (internal use) |
| Data_size | Memory access size (internal use) |
| Bcnt | Current position in current band buffer |
| Tmp_0 | Temporary register (internal use) |
| Tmp_1 | Temporary register (internal use) |
| Tmp_2 | Temporary register (internal use) |

The following registers are not in the register file, but are used for timing computations.

| Register: | Purpose: |
| --- | --- |
| L_margin | Video clocks to be left of the first dot |
| X_max1 | Program with (# of bytes in scan line −1) |

The base memory address should be aligned to 16 byte boundaries. The scans may be odd numbers of bytes wide X_max holds the number of bytes in a scan line rounded up to the nearest multiple of 8. X_max1 holds 1 less than the number of bytes per scan.

The constants ROM 32 are: 0, 1, 4, 8, 16.

The adder 34 performs arithmetic operations with the register file and constants. The results of computations, which may be written back into the register file, are used by the controller 35 to generate addresses, control and status. The output may be passed to the memory address generator which then fetches the next word to be serialized. The state is set by the controller and the adder flags (zero and carry out).

The video data is loaded into a FIFO or Video Data Queue 36. The serializer is loaded from the queue when it is empty. The queue has full and empty signals for the sequencer to thereby control the flow of data to prevent the loss of data or the emptying of the queue prior to the end of the scan. The depth of the queue is implementation dependent and is set by the expected worst case latency in the memory system and the intended maximum video clock rate, but is a minimum of 8 words.

The serializer 38 is a buffered parallel-to-serial shift register, which generates data at 1 bit/dot from 8 bits of data. The shift register shifts the serial data out of the video interface serial data output pin (Wdata). The data shifts when the sequencer indicates data is required by the print engine, at the rate of 1 bit per video clock (DClk). DClk is equal to ⅛ or ¹⁄₁₆ of the Wclk in Canon mode. In front page printing, the lowest significant byte from the queue is loaded first into the shift register, whereas for the back page, the most significant byte is loaded first. In front page printing the data is shifted right, whereas it is shifted left for back page printing.

The use of the PPC in color printers requires the use of multiple passes to display multiple colors or the use of packed pixels in the frame buffer which are serialized out of the PPC at a multiple of the video clock required by the engine (e.g. 4× for 4 bits/pixel).

The mode, command and status register 40 may be read or written to by the main processor and provide software control of scan conversion, software monitoring of scan conversion, and software control of PVP interrupts.

The controller sequences the scan unit under the control of the command register (accessed by IPU 20). The IPU loads a scan command by setting the start frame bit of the command register, which tells the controller to start scanning. The controller initializes the scan and sequences through the page. The scan pending bit is reset when the Base register is free to be reloaded so that another scan may be started. The controller performs a series of computations with the datapath to generate memory addresses to load the serializer and timing for the print engine, until the page is complete. When the page is complete, it restarts with a new address if the scan pending bit of the command register has been reset.

The mode register, is a read/write. The mode register contents are:

| Mode Bit: | | Reset Level: | Function: |
|---|---|---|---|
| <0> | TMDE | 0 | Timing mode |
| <1> | JBMS | 0 | JBMS mode |
| <2> | BBE | 0 | Band buffer enable |
| <3> | CINT | 0 | Print complete interrupt enable |
| <4> | VINT | 0 | Vertical interrupt enable |
| <5> | PRDY | 0 | PRDY interrupt enable |
| <6> | VSREQ | 0 | VRSEQ interrupt enable |
| <7> | BBI | 0 | Band buffer interrupt enable |
| <8> | DIV | 0 | Video Clock Division select |
| <9> | BLV | 0 | Black Level |
| <31:10> | reserved | 0 | Program to 0's |

"Timing mode" selects either Primary, JBMS, or Alternate timing mode:

| JBMS | TMDE | MODE |
|---|---|---|
| 0 | 0 | Primary |
| 0 | 1 | Alternate |
| 1 | 0 or 1 | JBMS |

Band buffer mode is selected if the BBE bit is a 1. If band buffer mode is not enabled, normal full page mode is selected.

CINT, VINT, PRDY and VSREQ are interrupt enables for the respective interrupt sources. If any of these bits are set to 1, the associated interrupt source is enabled to generate the PvP interrupt. More than one interrupt may be active at one time.

When the PRDY bit is set, if the PRDY pin transitions from inactive to active, an interrupt is posted. When the VSREQ bit is set, if the VSREQ pin transitions from inactive to active, an interrupt is posted.

The mode register must be programmed prior to the start of an operation (see the command register, below). The mode register is not double buffered. Changes to the mode register while the PVP are active is not allowed and may result in unpredictable behavior.

In primary mode, DIV tells the PVP clock generator to divide the video input clock by 8, if 0, or to divide the input clock by 16, if 1. In alternate or JBMS mode, the PVP does not divide the video input clock.

The black level is 1 if the BLV bit is 0 (the default level), otherwise, the black level is 0. When the video is blanked, its level is the same as the white level.

Reserved bits must be programmed to zero's to avoid potential side effects, since some bits may be used for production test features or future enhancements.

The command register, is a write only register. The contents may be read through the status register. The command register contents are:

| Command Bit: | | Reset Level: | Function: |
|---|---|---|---|
| <0> | STF | 0 | Start frame |
| <1> | RSET | 0 | Reset PVP (for diagnostics) |
| <2> | BKRL | 0 | Print Back Page, Right to Left |
| <3> | ERASE | 0 | Erase After Printing |
| <31:4> | reserved | 0 | Program to 0's |

The command register is used to initiate PVP operations and to support some testing functions. No operations will be initiated other than through the command register. The command register is double buffered. The first loading of the register enables a frame to be generated by the PVP. If the register is loaded a second time, a new frame will commence after the completion of the first, unless the second is a RSET or a testing function. If, subsequently, the command register is loaded a third time, prior to the completion of the first frame, the results may be unpredictable unless the RSET bit is set, in which case all operations will be aborted.

The command which is most important is the "start frame" command, which initiates the timing and DMA operations which the PVP performs during normal system operations. The command register is cleared and all operations halted if the PPC reset pin is asserted. All operations may also be abruptly halted by setting the "RSET" bit of the command register. The RSET bit overrides the other bits.

BKRL indicates that back side printing is to be performed, if it is 1. In this case, the page is scanned in reverse order (from bottom to top and from right to left). ERASE indicates that the frame buffer is to erased while printing. After a memory word is read for printing, it is erased. Reserved bits must be programmed to zero's to avoid potential side effects, since some bits may be used for production test features or future enhancements.

The status register holds pertinent information for the control and monitoring of the PVP. The bits are unique and have different characteristics. The status register is a read/write register whose contents are:

| Status Bit: | | Read/write: | Function: |
|---|---|---|---|
| <0> | FIP | Read | Frame in progress |
| <1> | FPD | Read | Frame pending |
| <2> | CINTA | Read/clear | Page completed |
| <3> | VINTA | Read/clear | Vertical timer completed |
| <4> | BBIA | Read/clear | (Band) buffer completed |
| <5> | PRDYAP | Read/clear | PRDY positive edge transition received |
| <6> | PRDYAN | Read/clear | PRDY negative edge transition received |
| <7> | VSREQA | Read/clear | VSREQ transition received |
| <8> | LSYNC | Read | LSYNC pin level |
| <9> | FSYNC | Read | FSYNC pin level |
| <10> | PRDY | Read | PRDY pin level |
| <11> | PPRDY | Read | PPRDY pin level |
| <12> | Prnt | Read/Write | Print pin level |
| <13> | CPrdy | Read/Write | CPrdy pin level |
| <14> | MREQ | Read | Memory request pending |
| <15> | BLANK | Read | Horizontal blanking status |
| <16> | FIFOE | Read | FIFO Empty |
| <17> | FIFOEB | Read | FIFO Block Empty |
| <18> | FIFOF | Read | FIFO Full |
| <19> | FIFORE | Read/clear | FIFO Refill Error |
| <20> | ERASE | Read | Erase Frame Buffer After Print Enabled |
| <21> | BKRL | Read | Print Back Page, Right to Left |
| <22> | VSync | Read/Write | VSync pin level |

The FIP bit indicates that a frame has been started, but has not yet completed. The FPD bit indicates that a second operation has been loaded, but has not yet started, except in the case of a reset command, which will halt all operations and clear these bits.

The state transition bits (CINTA, VINTA, BBIA, PRDYA, VSREQA) indicate that their associated event has occurred, and that they have not yet been cleared. If their associated interrupt enable has been set, they generate interrupts when active. The interrupts are cleared when the status register state bits are cleared by writing 1's to the bits to be cleared. Writing 0's to the associated bits leaves them unchanged. Once set by the hardware, the associated state bit is not reset except as described above, when the reset pin of the PPC is active, or the PVP reset command is executed.

The pin level bits hold the levels of the I/O pins. The LSYNC, FSYNC, PRDY and PPRDY pins are all inputs (therefore read only), while the VSYNC, Prnt and CPRDY pin are outputs. The VSYNC, Prnt and CPrdy pins are cleared to 0 by reset operations, and are programmable to any level by processor writes to the status register.

The TMDE, BBE and interrupt enable bits hold the values last programmed into the mode register.

The MREQ status but indicates that the PVP has one or more outstanding memory requests which have not yet been completed. The BLANK bit indicates that the PVP timing indicates that horizontal blanking is currently occurring. The FIFO status bits hold various FIFO control states. All of these bits are intended for use in testing.

All interrupts are reset when the PPC is initialized by the reset pin, a reset instruction is set to the PVP command register or the individual bits are reset through the status register.

When the V_int register is loaded, it is decremented on each line reset (when X_current is loaded from X_max). When V_int becomes less than 0, the VINTA status bit is set. An interrupt is sent to the IPU if the VINT interrupt enable bit is set. V_int is generated after the data in the scan line pointed to has been sent to the printer.

The print complete state (CINT) is set after the last scan of data has been sent to the printer. The print complete interrupt is posted if the status bit is set and its interrupt enable is set.

The PRDY interrupt is set when the PRDY pin transitions from inactive to active (PRDYAP transition bit is set in status register) if the PRDY interrupt is enabled. The PRDY interrupt is also set when the PRDY pin transitions from active to inactive (PRDYAN transition bit is set in status register) if the PRDY interrupt is enabled.

The BBI interrupt is set when the PVP is in band buffer mode, the BBI interrupt is enabled, the current Buffer has been printed (the BBI status bit is set) and the Base registers have been swapped. When band buffer mode is not selected, the BBI status bit is always cleared.

Timing

FIGS. 11-14 illustrate the timing of the PPC video interface as used with a conventional laser printer. Synchronization is performed on all interfaces between the video data clocked logic (clocks derived from the Wclk pin) and system-clocked logic. The timing controller contains circuits which are synchronous to both the Wclk and the internal PPC clocks. It generates timing and control for the serialization hardware, the sequencer and the timing pins. Although the print engine allows the controller to generate the video data clock (Wclk), the PPC does not generate it, but requires the board or print engine to generate the clock as in the alternate mode. This clock may be asynchronous to the PPC/clocks.

The sequence of events which occurs in the video processor is:

1) The video register file parameters are pre-loaded, including the base register. This is normally done during the initialization of the printer, unless the page size, frame buffer address or margins are changed.

2) The PRdy pin is asserted by the printer.

3) The Prnt pin is asserted by the controlling software.

4) A print command is loaded by the IPU into the command register.

5) When the FSync input is asserted, the sequencer begins to time the top margin (programmed by register T_ margin).

6) When the top margin timer completes, the sequencer waits for the next LSync input.

7) When the next LSync input is received, the sequencer begins the left margin timer (programmed by register L_margin) and fetches the first frame buffer data to be sent to the printer, when the printer is ready.

8) When the left margin timer/completes, video data begins to pass out of the PPC chip on the Wdata pin synchronous to the Wclk input clock. The end of the scan is determined, again by the L_margin counter but using the X_MAX register data.

9) At the end of the scan, the sequencer again waits for the LSync and L_margin timer until the last scan is completed.

10) When the last scan is complete, the sequencer awaits the next print command. If a pending print command is present, a new frame is immediately started.

The T_margin (FIG. 12) and L margin (FIG. 11) timers are used to synchronize the video data to the paper and the printer scanner, respectively. The timers are synchronized to the FSync and the LSync input pins, respectively.

The T_margin counter holds the number of LSync pulses to be counted after FSync but before the start of printing. T_margin timing is performed by the sequencer an the register file. The LSync pulses are synchronized to the PPC clocks and counted. Only the leading edge of Lsync is significant.

The L_margin counter initially holds the number of printer video clocks in each line prior to the start of printer data on each scan line. This number is loaded into a hardware counter in the Timing Controller at the start of each L_sync, which is then decremented by Wclk. When the count is exhausted, the video data beings to serialize out of the PPC. The L_margin counter is then re-initialized to the number of pixels within the scan line to be scan converted and used to blank the video at the end of the scan line and to control the reading of the FIFO. When the L_margin count expires, the video data serialization is complete. The VDO is blanked after the expiration of the scan line pixel count.

Primary mode operation uses UART 0 for interfacing with the printer engine. UART 0 is used to generate serial control signals and receive the serial status information.

The operation of UART 0 changes it into a synchronous type of receiver/transmitter. The clock is generated by the PPC internally and passes out of the chip on the U0clk pin. The timing meets the requirements of the Canon print engine. The receive and transmit data circuitry uses a special clock which only transitions when data is to be transmitted to the engine or status returned by the engine. The U0clk frequency is programmed into the UART 0 baud rate generator. FIGS, 13 and 14 illustrate the Canon mode UART 0 output timing and input timing, respectively.

PPC Memory System

Figure 8:
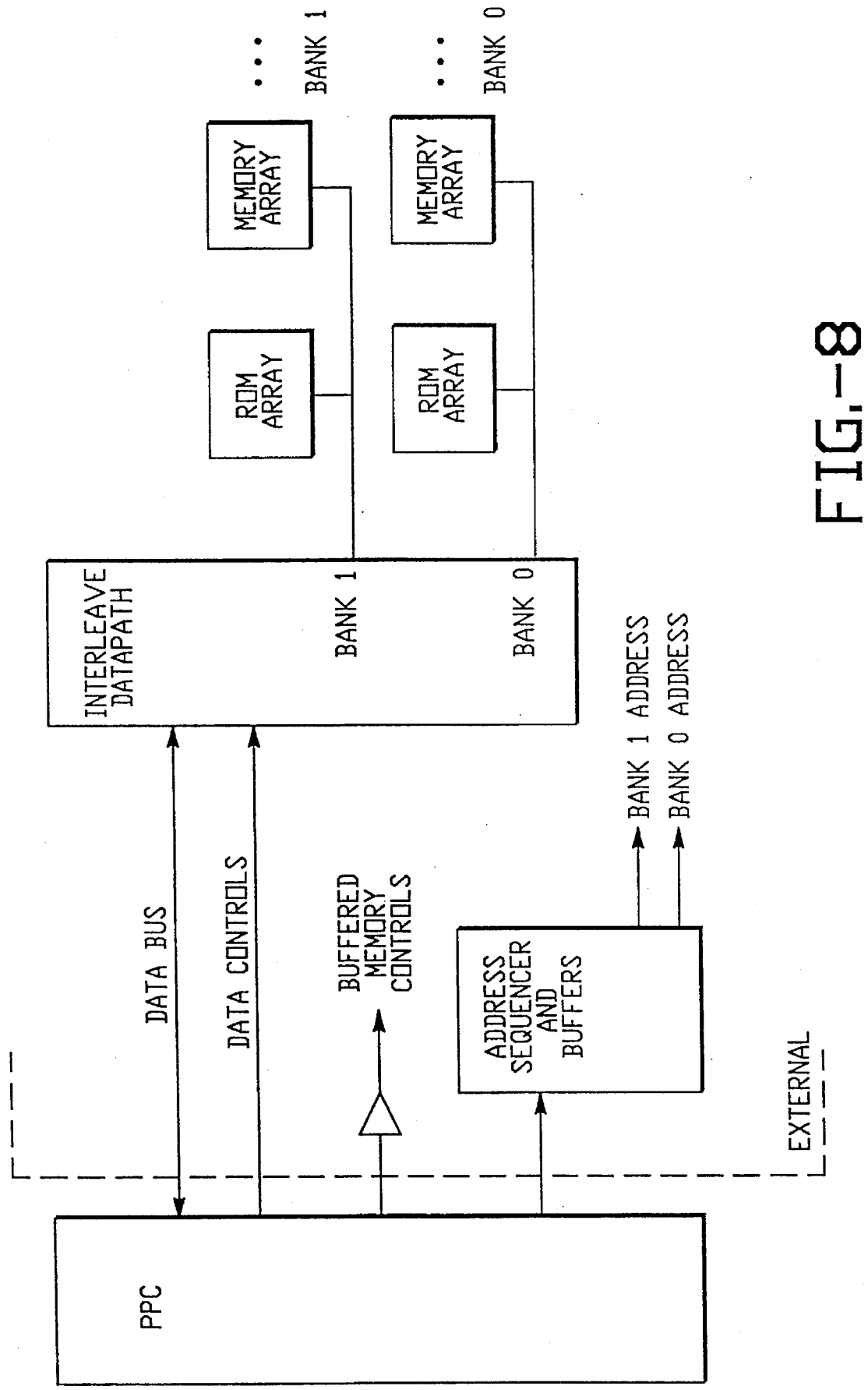
FIG. 8 illustrates memory system structure.

The PPC memory system is illustrated in FIG. 8 and consists of arrays of memory (e.g. 32 or 39 bits, depending on the data bus width and whether ECC is implemented or not) of memory treated as a group of memory words. The arrays are ordered into 2 banks (i.e. 2 way interleaved). The banks consist of one or more RAM arrays and optional ROM arrays. The ROM and RAM interleave, timing and memory depths are independent. Up to 8 arrays per bank are directly supported by the initial PPC, providing up to 16 MB of memory with 256K ×4 RAM chips or 64 MB of memory with 1M×4 RAM chips.

The banks of memory are interleaved through the use of data multiplexing and buffering circuits. The RAM arrays require timing and control signals (RAS, CAS, WE) to be generated and buffered. The PPC generates the required signals, but external buffers are used to provide sufficient drive for the memories and meet their timing requirements. The row and column addresses are multiplexed out of the PPC on one set of address pins. The addresses require some pipelining outside the PPC to make use of the memory bandwidth available from the RAM chips.

Figure 9:
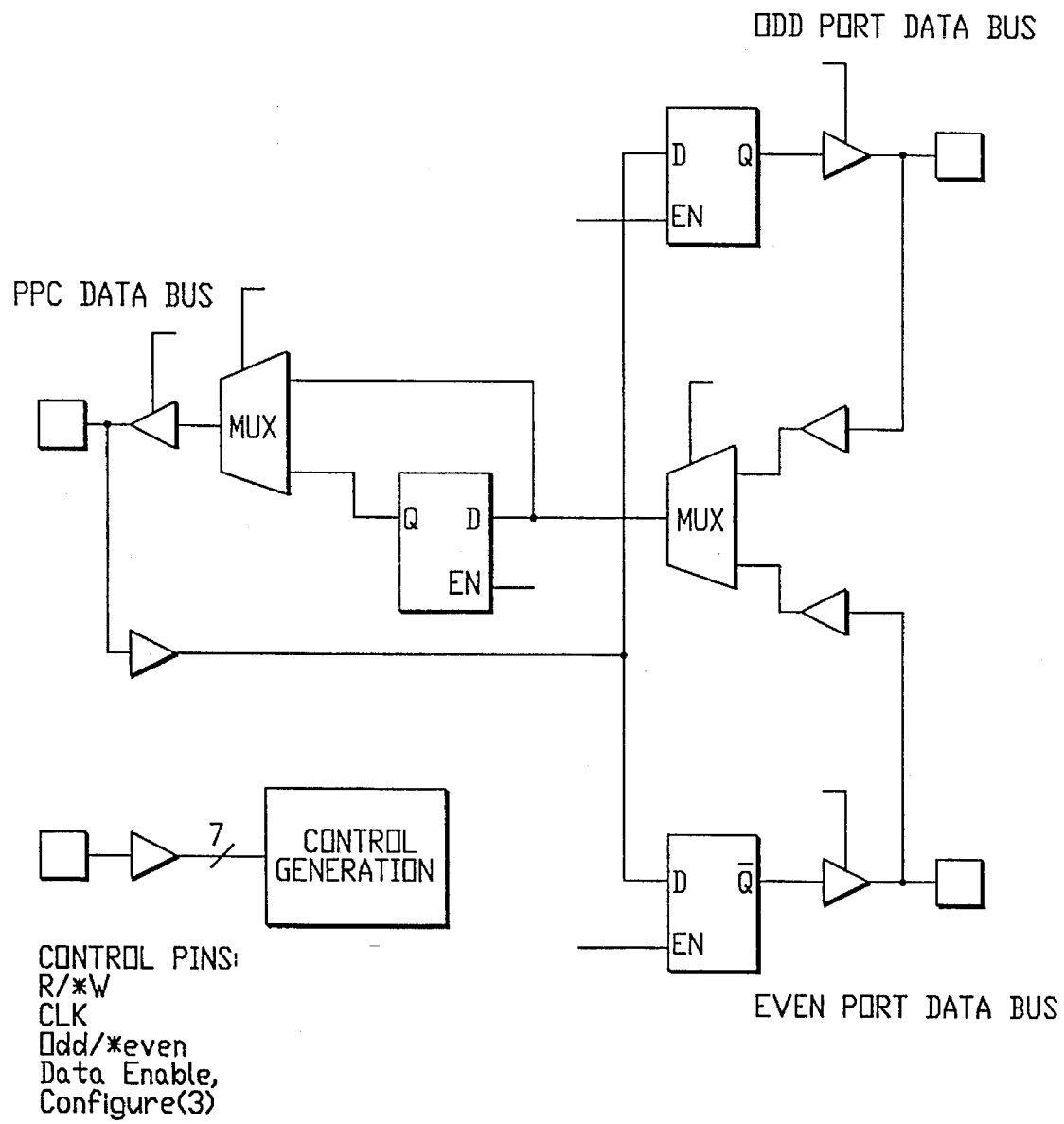
FIG. 9 illustrates data chip, two-way interleaved.

FIG. 9 is a diagram of the data chip which interleaves read and write data from the various banks into the PPC during read cycles and holds write data for the individual banks during write cycles. The PPC connects to a bidirectional data port, while the banks connect to individual bidirectional ports.

Figure 10:
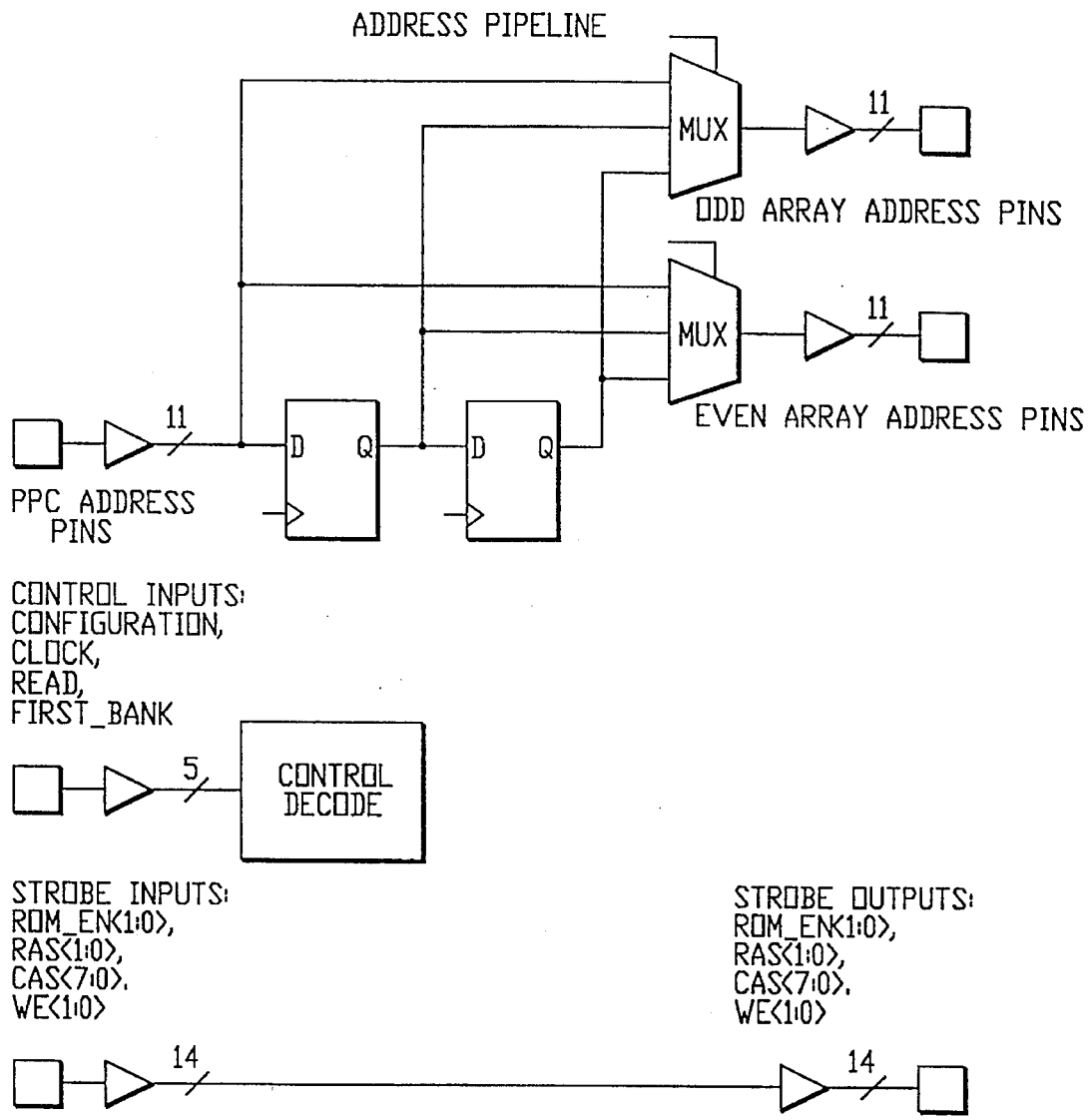
FIG. 10 illustrates address chip, two-way interleaved.
Figure 11:
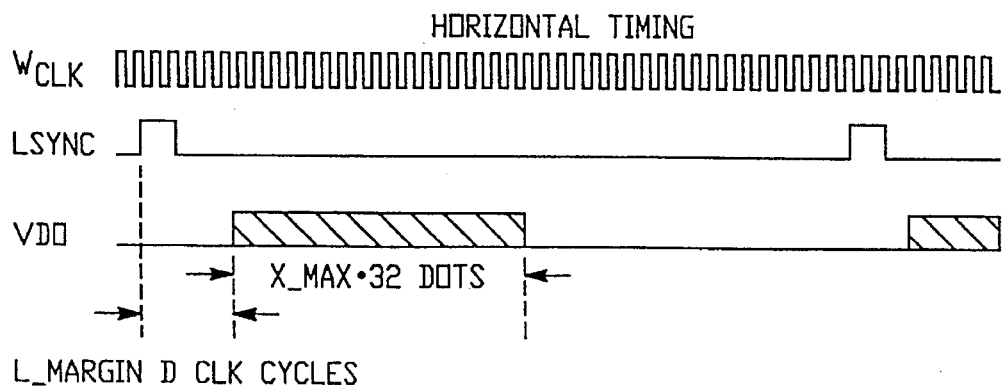
FIG. 11 illustrates horizontal timing.
Figure 12:
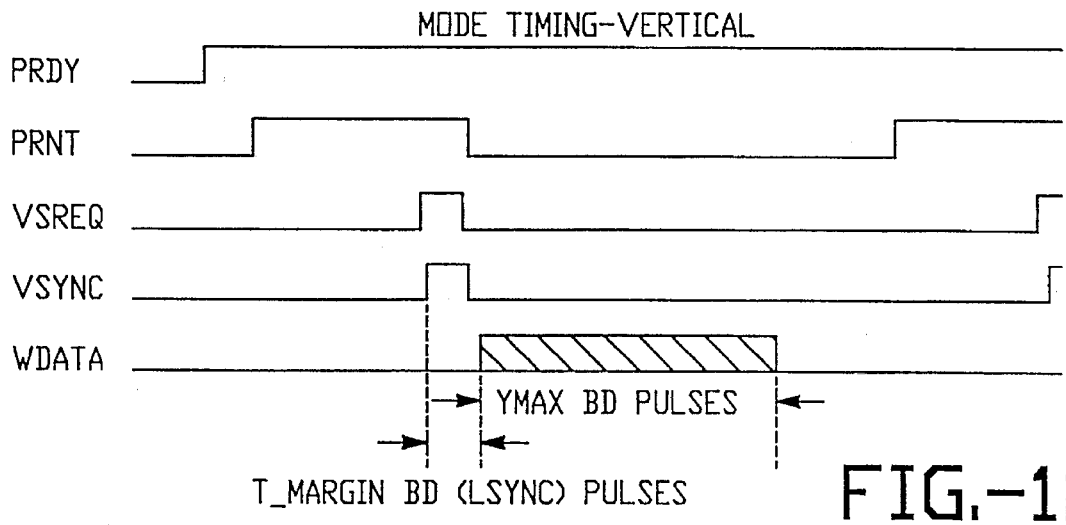
FIG. 12 illustrates vertical timing.
Figure 13:
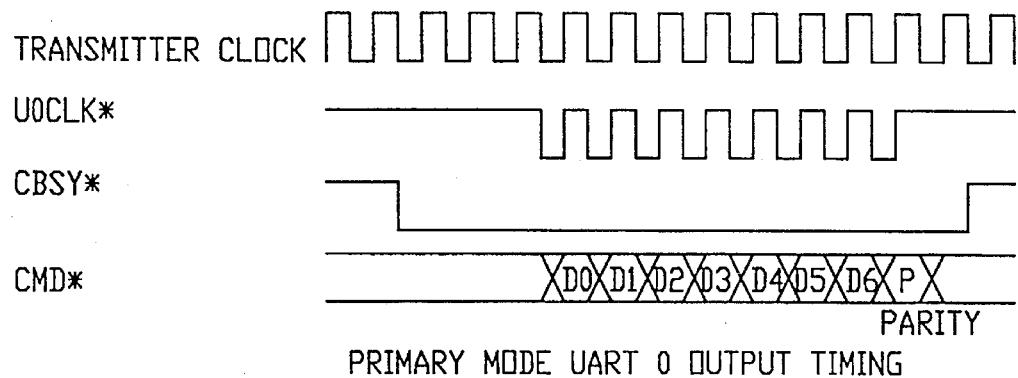
FIG. 13 illustrates UART O output timing.
Figure 14:
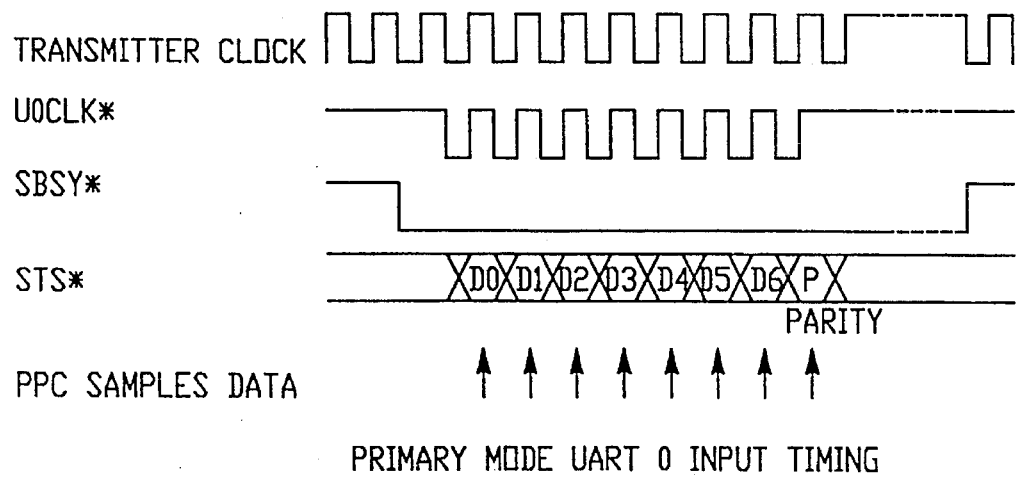
FIG. 14 illustrates UART O input timing.

FIG. 10 is a diagram of the address chip which is used to pipeline row and column addresses to the memories and buffer the memory strobes (RAS, CAS, etc.) for driving the memories. The memory loads may be high, and require buffering between the PPC pins and the high capacitance loads. In addition, the addresses which pass to the memory banks are pipelined differently, depending on which bank is accessed first.

The configuration allows each chip to be used to buffer multiple (e.g. 8) arrays of 32 bits (EEC may be included). One chip is required for small systems which require only a few arrays, but 2 chips maybe required for a system which requires 16 arrays. Multiple DRAM organizations such as 256K×4 or 1M ×4 DRAM's may be used. Using 1M×1 or 4M×1 DRAMS' will increase the address and control pin loading by approximately a factor of 4. Wider systems, such as 64 bits and other interleaves may be implemented such as 4 way interleaving.

In 64 bit systems, two chips may be used together for each pair of banks resulting in the need for 2 chips for a 2-way interleaved 64 bit system with up to 4 arrays/bank and 4 chips required for a 4-way interleaved 64 bit system. Buffering all memory address and timing strobes with the same chip allows the skew of these signals to be reduced, allowing tighter memory timing to be reliably implemented. Using separate buffer chips increases the skew of the memory timing signals. The configuration of FIG. 9 allows one 128 pin chip to drive 2 banks of 32 bits each containing up to 8 arrays. Other configurations are possible.

I/O Interface

Figure 15:
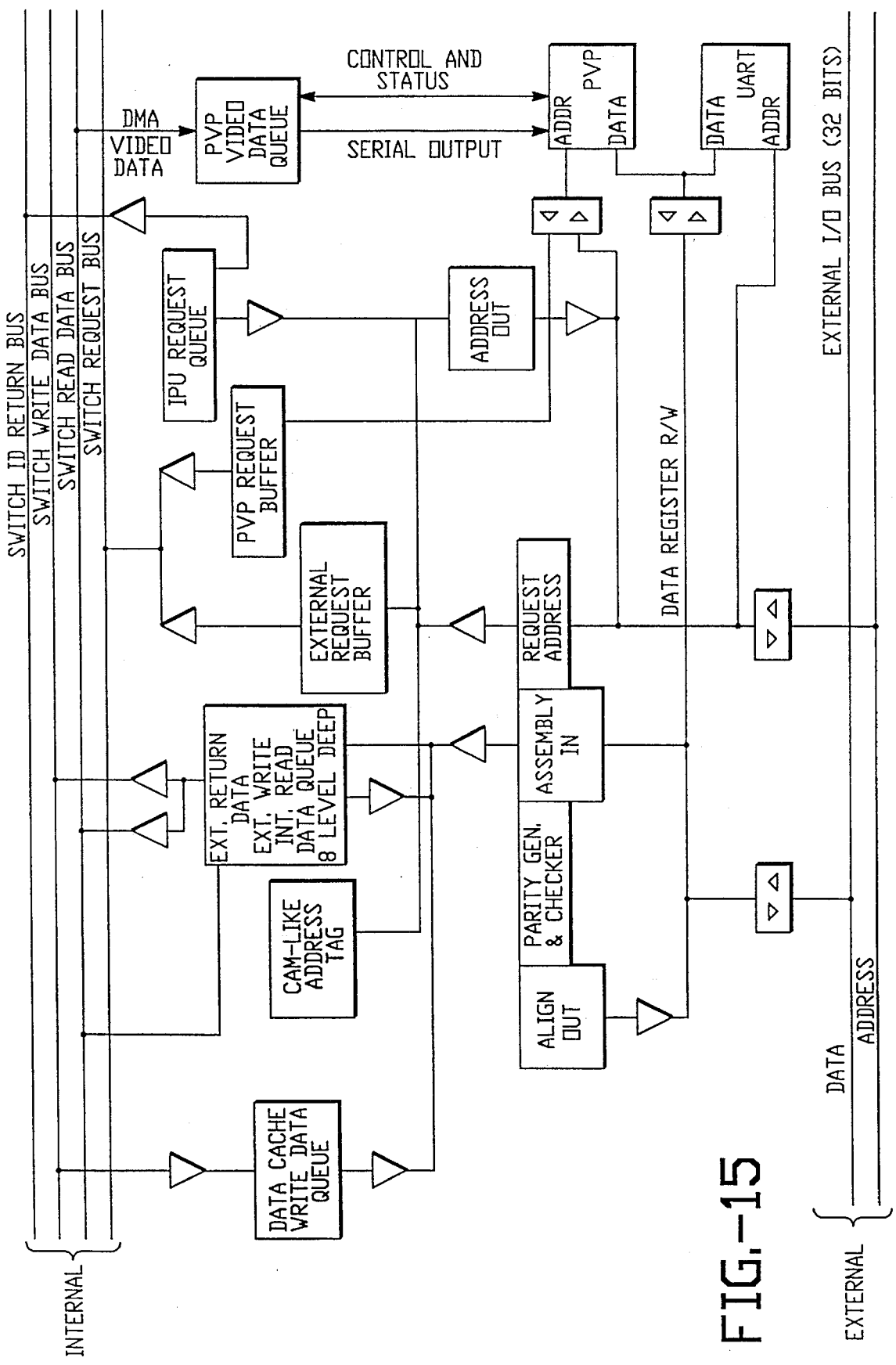
FIG. 15 is a functional diagram of the I/O controller datapath.

FIG. 15 is functional block diagram of the I/O controller datapath. The I/O interface controller is designed to provide an interface between the internal IPU, the memory subsystem and external slave and DMA devices. The I/O controller provides and responds to handshaking signals which control the timing and direction of data flow. See patent application Ser. No. 07/726,893, now U.S. Pat. No. 5,440,752, which issued on Aug. 8, 1995 Briefly, the Printer Video Processor (PVP) and the memory Interface are integrated with the I/O controller for sending and receiving addresses and data. It will be noted that the PVP addresses memory through the I/O controller with requests sent through a PVP Request Buffer, but video data is available to the PVP by direct memory access (DMA) through the PVP Video Data Queue.

Operand alignment logic is used to assemble and align incoming data from external I/O and to re-align outgoing aligned data to external I/O by decoding the lower bits of the address and the byte enables associated with the data. Incoming data from I/O is assembled into aligned blocks, as decoded from the lower bits of the address and placed into an internal data queue. Aligned incoming data from the assembly logic is accumulated in the queue and is sent to memory after a large block of data has been assembled in the queue. The Data is sent to the switch by the queue in a burst, which allows data to be transferred with high bandwidth and minimizes memory subsystem usage by the I/O.

Outgoing data from the memory or the IPU, which comes in aligned blocks is re-aligned according to the associated address and data size, and may be passed out of the interface in multiple bus cycles or in burst mode cycles. The number of cycles depends on the data size and the external device size (8 or 16 bits).

Unaligned DMA data transfers can be supported on the I/O bus as long as addresses are contiguous. However, DMA write data and data being read by the IPU must be aligned to the appropriate byte(s) on the bus.

IPU reads or writes, which are directed to the PVP, UART's or external I/O devices require that the I/O interface arbitrate for the external I/O bus and perform address decoding before the transactions can be completed. Even though the PVP and UART's are resident on the chip, they are treated almost the same as external I/O devices and access requires the I/O interface to acquire the I/O bus.

The I/O bus is a synchronous 16 bit bus interface. The bus employs separate parallel busses for address and data. The data bus is 16 bits wide, bidirectional. The address bus consists of 31 upper order bit address lines pointing to the 2-byte word location and 2 individual byte enable signals to select active byte within the 2-byte word. The bus is synchronous to the bus clock, which is an output clock generated from the system clock. This clock is intended to be the master clock for all bus decoding and control logic. Dynamic bus sizing is supported by the bus to allow connection of 8 and 16 bit peripherals.

Bus requests by the processor which are more than the bus width (16 bits) or which access devices which are narrower than the data size of the operation will generate multiple bus cycles. An example of the first case is when the processor executes a quad word store to the I/O space, which translates to either eight 16-bit cycles or sixteen 8-bit cycles, depending on the maximum bus size and the *size 8 pins. The I/O bus has a burst mode mechanism to enable high speed data transfers. During burst cycles, a new data items can be clocked out during every clock.

The bus allows external bus masters (DMA devices or other processors), but performs arbitration between the internal I/O controller and external master internally.

External interrupts are also handled by the bus interface dedicated level sensitive interrupt inputs and an external controller are both supported. During the second locked interrupt acknowledge cycle of an external controller interrupt acknowledge sequence, the interrupt vector is read by the interface from the bus and passed to the internal interrupt controller and then to the IPU.

The I/O bus supports non-cacheable bus transfers such as single cycle, multiple cycles, or burst cycles. 8-bit or 16-bit devices are supported. The minimum bus cycle requires two clock cycles. The start of a cycle is signaled by the assertion of the *ADS pin. The end of a bus cycle is indicated by the assertion of the *RDY or *BRDY after *BLAST has become active. A single bus transaction can require multiple data transfers.

Figure 16:
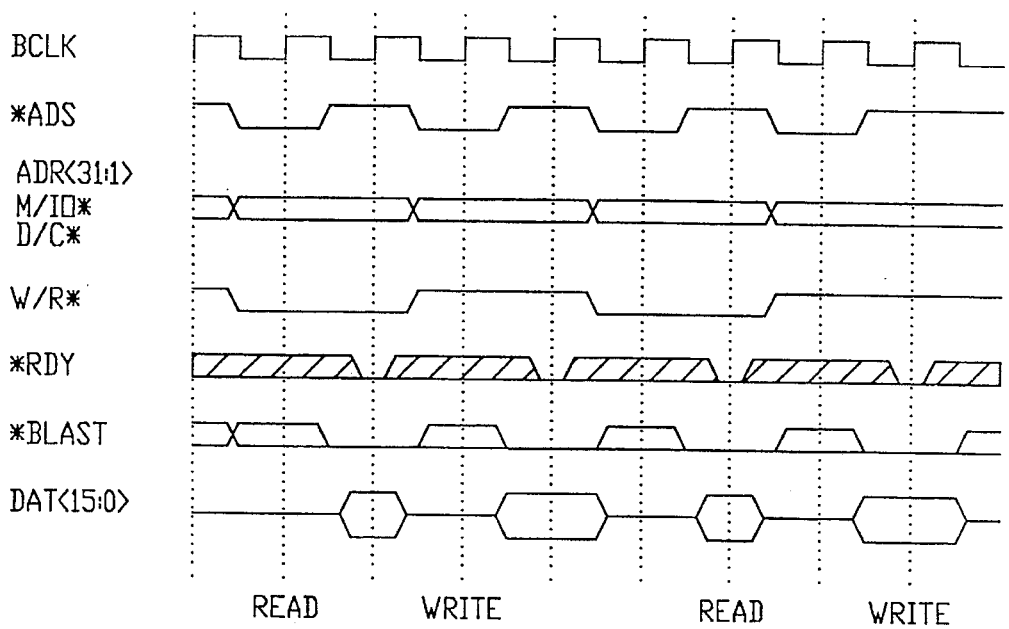
FIGS. 16–21 are timing diagrams illustrating I/O bus transactions.

The zero wait-state non-burst bus cycle required two clocks. It can support read or write cycles in two clocks (see FIGS. 16 and 17) and is called a 2-2 bus cycle. The assertion of the *ADS at the rising edge of the clock indicates the beginning of a valid bus cycle and that a valid address and bus definition pins are on the address bus and cycle definition lines. The bus cycle is terminated by the combination of *BLAST and *BRDY, or just the assertion of *RDY.

Figure 17:
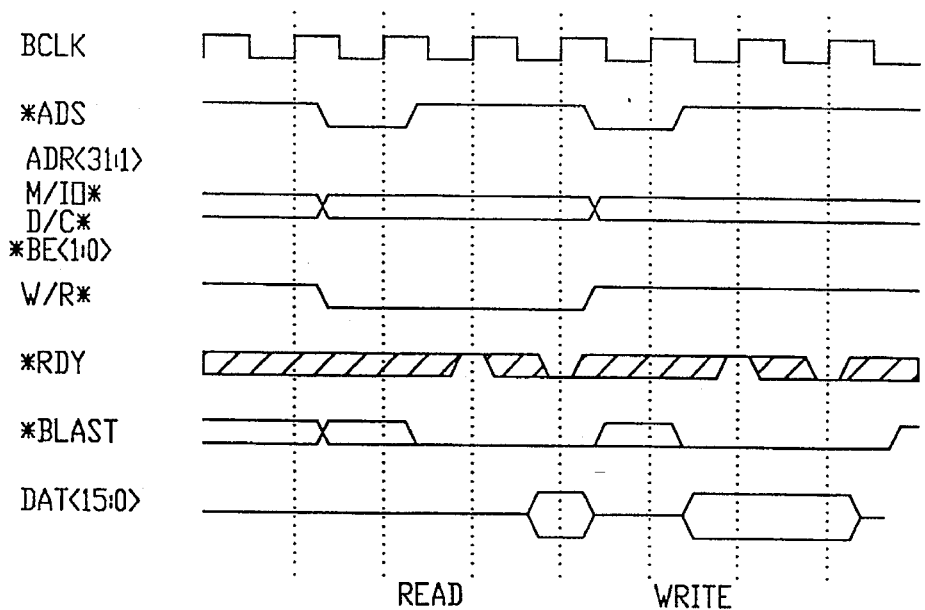

Wait states can be inserted in a bus cycle by driving the *RDY inactive as shown in FIG. 17. By driving *RDY inactive, any number of wait states can be inserted.

Figure 18:
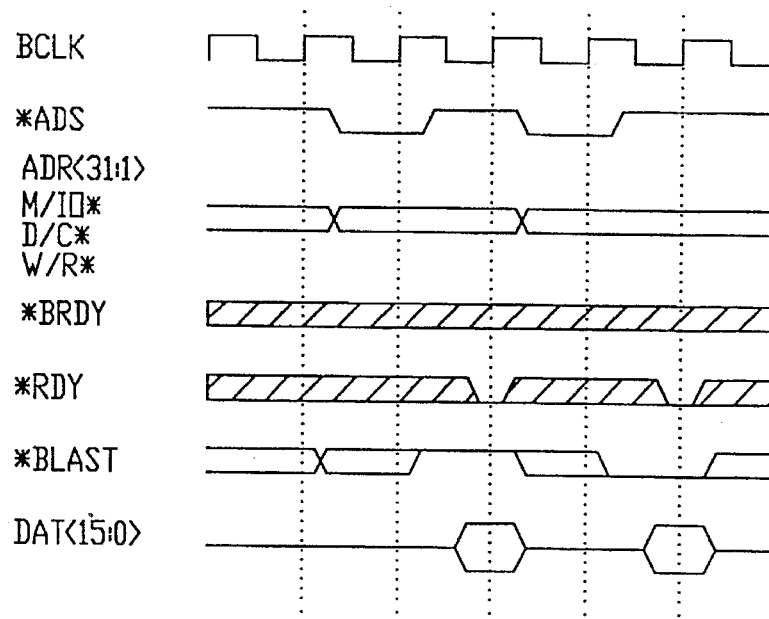

Referring to FIG. 18, non-burst mode multiple cycle transfers are performed when the slave asserts RDY (which overrides BRDY). If the master is actually transferring a clock of data, it will hold *BLAST deasserted at the end of every second clock to strobe data into the CPU. If RDY and BRDY are both deasserted, the transfer is extended (wait states are added). Individual transactions may be executed in the same way, except the BLAST is asserted during each individual cycle.

Figure 19:
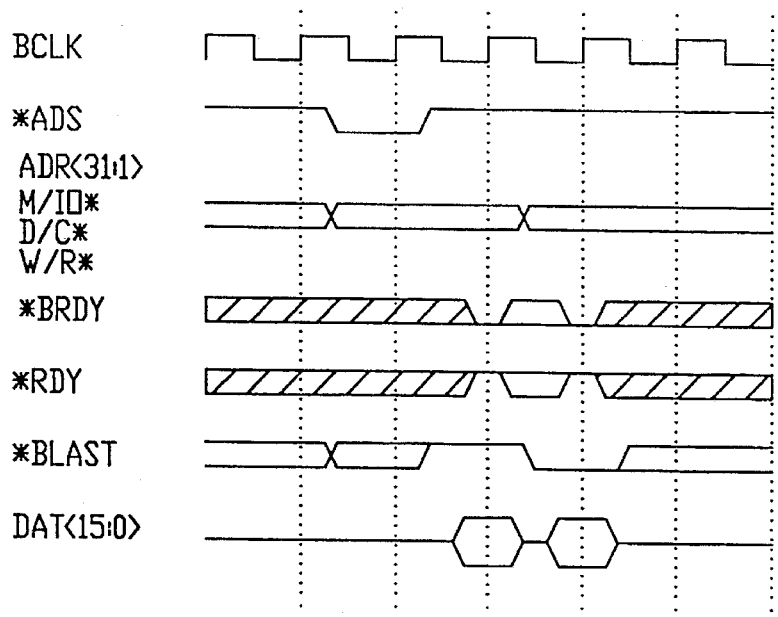

Burst cycles are acknowledged and allowed by the slave if *BRDY is asserted instead of *RDY. *RDY must be driven inactive, as illustrated in FIG. 19. Wait states are inserted into the burst cycle when the slave drives *BRDY and *RDY inactive at the end of second and subsequent clocks. The individual transfers are completed when *BRDY is asserted. Burst mode may be terminated by the slave if it asserts *RDY. The order of burst transfer for data is determined by the first address presented by the IPU. The burst order is one of the cases in the following table:

DMA

Figure 22:
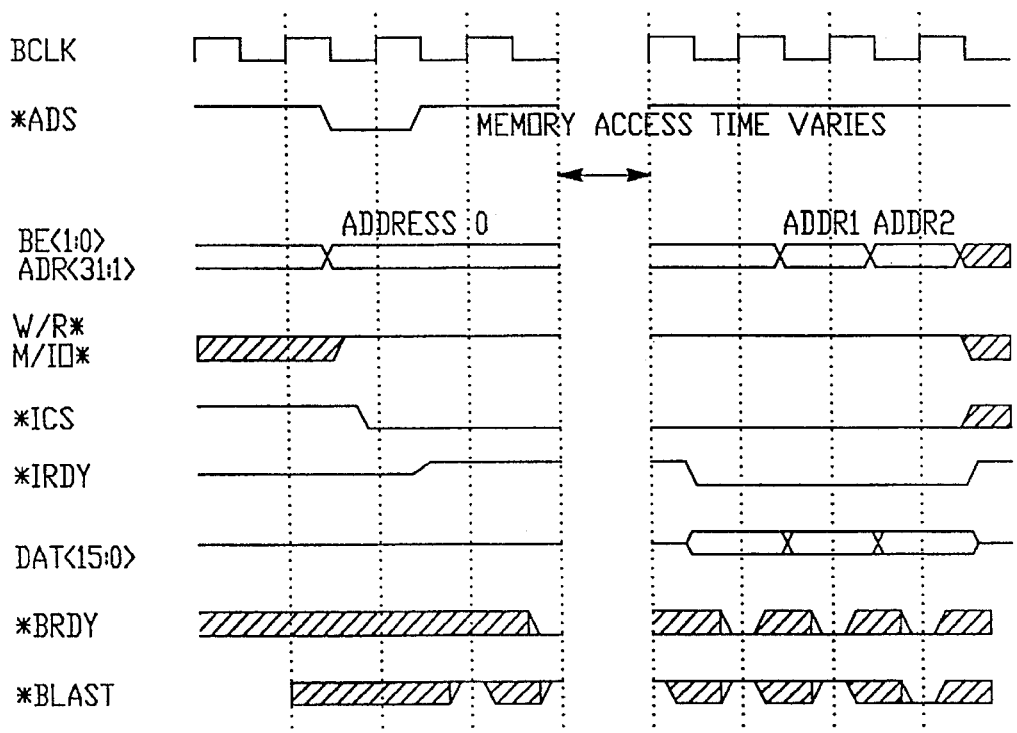
FIG. 22 illustrates DMA read cycles.
Figure 23:
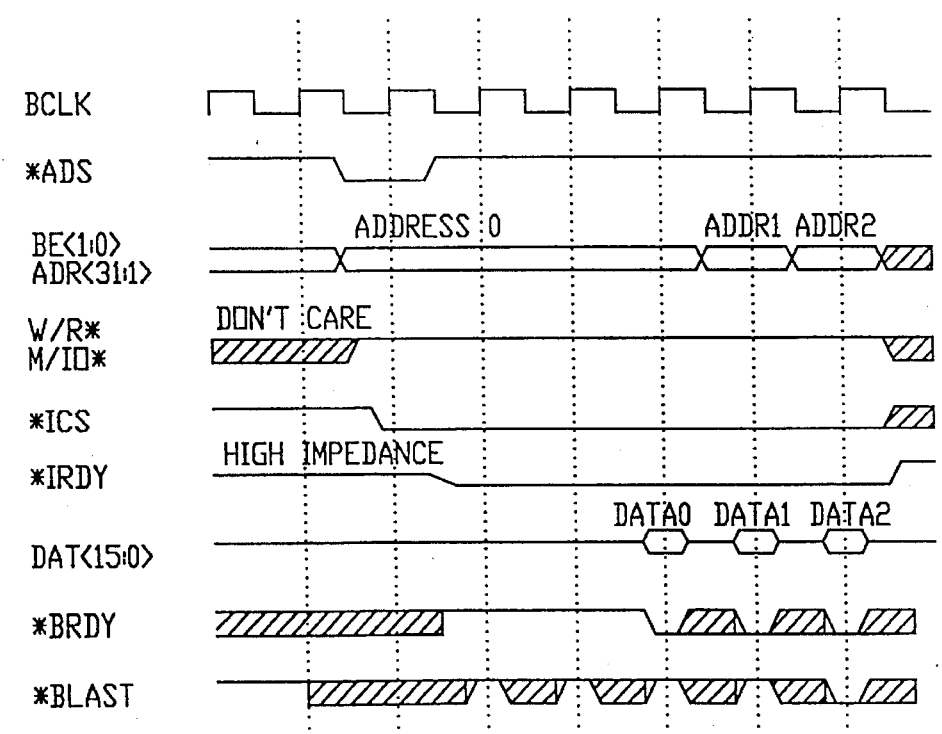
FIG. 23 illustrates DMA write cycles.

FIGS. 22 and 23 illustrate the DMA Read cycles and DMA Write cycles, respectively.

A DMA read cycle starts when ADS is asserted. The ICS pin and address are sampled during the rising edge of BClk. The data is requested from the MCU. When the data returns, the requested data is driven onto the data pins and the IRDY pin is asserted. The IRDY pin is asserted to indicate that the cycle can be completed, but the cycle does not complete until the RDY pin is asserted. BLAST is used to indicate to the I/O interface that the cycle is the last in a burst. BLAST is always sampled.

A DMA write cycle is similar to a read cycle, except that the I/O is receiving data. It also uses IRDY and BLAST in a similar manner to DMA read cycles. As long as the I/O interface can receive new data, IRDY will remain asserted. If its internal queue fills up, for example, it will deassert IRDY. It also waits for RDY to be asserted before completing the cycle.

For DMA write requests, data and address information is sent to an internal queue. Data is aligned to the location required by the MCU on its way to the queue and once the aligned data is accepted by the queue, the queue will respond by sending a signal back to the DMA device indicating that it is ready to accept more data. If the queue is full, the ready signal is held deasserted. When the external device stops sending data, or when the data can no longer be accumulated by the queue, the MCU is requested to write the data to memory. The MCU will perform the write when its arbiter grants the I/O unit access to the memory port. The data block will then be sent to the switch together with the request information.

For DMA read requests, the address presented by the external DMA device is presented to the MCU. This address is used to address an aligned block of memory (depending on the memory system interleave and bus width). When the data is returned to the I/O queue, the request, ed data is returned to the requesting DMA device.

| First Addr. | Second Addr. | Third Addr. | Fourth Addr. | Fifth Addr. | Sixth Addr. | Seventh Addr. | Eigth Addr. |
|---|---|---|---|---|---|---|---|
| 0 | 2 | 4 | 6 | 8 | A | C | E |
| 8 | A | C | E | 0 | 2 | 4 | 6 |

Figure 20:
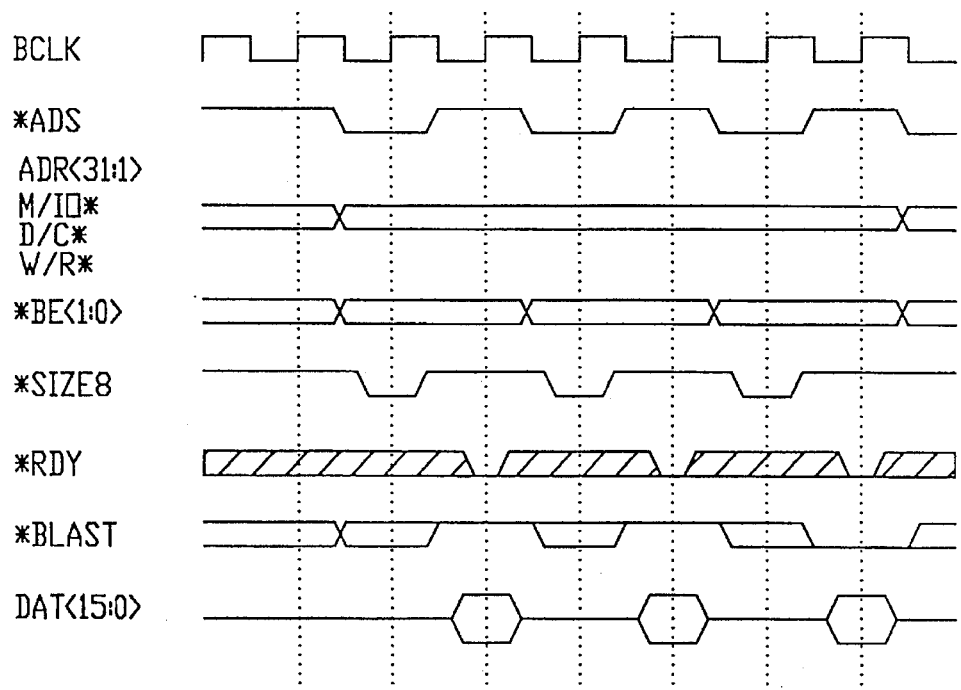
Figure 21:
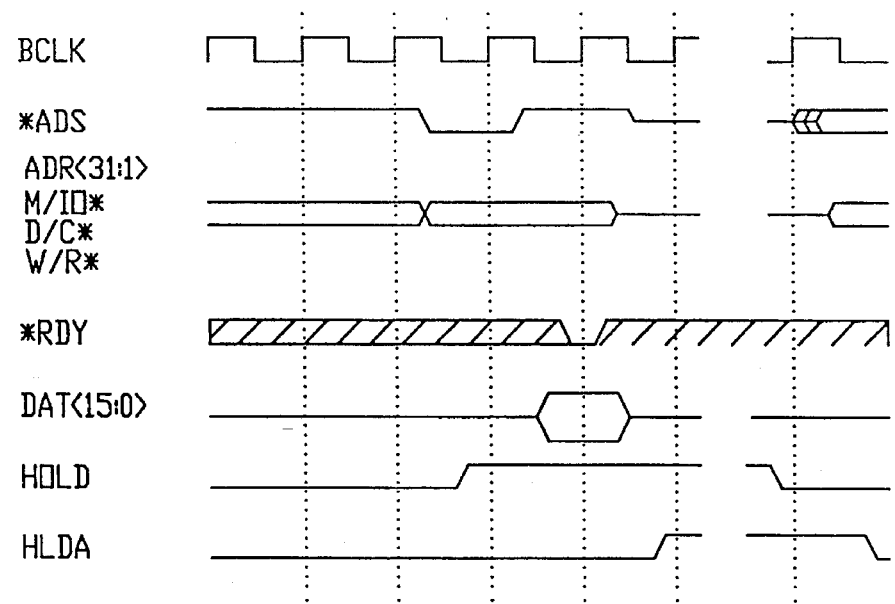

The bus allows connection to 8 bit or 16 bit devices using the *SIZE 8 pin during bus cycles. The bus size pin is sampled on every bus cycle. An 8-bit transfer is selected if *SIZE 8 is asserted. *SIZE 8 must be asserted before the first asserted *RDY or *BRDY is sampled. Multiple bus cycles are generated if the device being accessed has smaller bus width than the data size of the transfer operation or alignment requires multiple cycles. An example is illustrated in FIG. 20.

The assertion of the HOLD indicates that another bus master is requesting control of the bus. After the current bus cycle is completed, the bus is floated (D<31L0>, *BE<1:0>, W/R*, D/C*, M/I*, and *ADS are placed in a high impedance state). HLDA is asserted to indicate that the processor has released the bus to another master. Refer to FIG. 22. The I/O bus is relinquished until HOLD is deasserted.

PPC Pins

In the described embodiment of the PPC the following pins are utilized:

| Miscellaneous Subtotal: | | | |
|---|---|---|---|
| SClk | <1:0> | in | External Clock Inputs |
| *Testi | | in | Test Input |
| *Testo | | out | Test Output |
| *IOts | | in | Forces Outputs to Tri-state |
| *Sstp | | in | IPU Single Step |
| Print Engine 9 | | | |
| WData | | out | Printer Data Output |
| VSync | | out | Vertical Sync Output |
| Prnt | | out | Printer Print Command Output |
| CPrdy | | out | Controller Power Ready |
| WClk | | in | Wdata Serial Clock |
| LSync | | in | Line Sync Strobe |

-continued

| | | | |
|---|---|---|---|
| FSync | | in | Frame Sync Strobe |
| PRdy | | in | Printer Ready |
| PPRdy | | in | Printer Power Ready |
| Memory Port Subtotal: 72 | | | |
| MData | <31:0> | i/o | Memory Data |
| MAdr | <10:0> | out | Row/Column Address |
| MRAS* | <1:0> | out | RAS Pins |
| MCAS* | <15:0> | out | CAS Pins |
| MRRAL* | <1:0> | out | ROM Row Address Latch |
| MREN* | <1:0> | out | ROM Enable |
| MWE* | <1:0> | out | Write Enables |
| MRD | | out | Read |
| MODD* | | out | Odd Bank Latch Enable |
| MOVLD* | | out | Odd Valid |
| MBK | | out | Starting Bank |
| TClk | | out | Tracking Clock Output |

| I/O Bus Subtotal: 73 | | | |
|---|---|---|---|
| Pins: | Bits: | I/O: | Functions |
| BClk | | out | Bus Clock |
| BClkf | | in | Bus Clock Frequency/Phase |
| Reset | | in | Power-up Reset |
| ADR | <31:1> | i/o | Address |
| *ICS | | in | Chip Select |
| *BE | <1:0> | i/o | Byte Enables |
| DAT | <15:0> | i/o | Data |
| *ADS | | i/o | Address Strobe |
| *RDY | | i | Slave Ready |
| *BRDY | | i | Burst Ready |
| *IRDY | | o | Ready Output |
| *BLAST | | i/o | Burst Last |
| DC | | i/o | Bus Cycle Definition |
| W/R | | i/o | Bus Cycle Definition |
| M/IO | | i/o | Bus Cycle Definition |
| *SIZE8 | | in | 8 Bit Device |
| BREQ | | out | Bus Request |
| HOLD | | in | Bus Acknowledge |
| HLDA | | out | Bus Grant |
| *BOFF | | in | Bus Float Pin |
| NMI | | in | Non-maskable Interrupt |
| INTR | | in | Maskable interrupt request |
| DINT | <3:0> | in | Direct Maskable Interrupt Inputs |
| Print Engine Control and UART 9 | | | |
| U0rxd | | in | U0 receive data |
| *U0cts | | in | U0 clear to send |
| U0txd | | out | U0 transmit data |
| *U0dtr | | out | U0 data terminal ready |
| *U0clk | | out | U0 Canon CCLK signal |
| U1rxd | | in | U1 recieve data |
| *U1cts | | in | U1 clear to send |
| U1txd | | out | U1 transmit data |
| *U1dtr | | out | U1 data terminal ready |

Summary

There has been described a page printer controller which utilizes a RISC microprocessor architecture especially designed for control of a page printer. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A computer system, comprising:
   a host computer;
   a memory array;
   a printer engine; and
   a single-chip printer controller, coupled to said host computer, said memory array, and said printer engine, said printer controller having means for communicating with said host computer, said printer controller further comprising:
   (1) a printer video processor for generating a plurality of control signals for said printer engine, for generating memory addresses of data to be fetched from said memory array, for serializing fetched data, and for providing serialized data to said printer engine;
   (2) an instruction processor implemented as a super-scalar microprocessor, comprising:
      (a) one or more graphical functional units, interconnected in said instruction processor as internal functional units to support operation of said primer video processor, comprising at least one of:
         (i) an orthogonal rotator unit for assembling blocks of orthogonally rotated bit map data,
         (ii) a bit/byte mirror unit for outputting received data in reverse order, and
         (iii) a pixel modification unit for modifying pixels in response to graphics instructions; and
      (b) an instruction scheduler for issuing instructions in parallel to said graphical functional units; and
   (3) a memory controller, coupled to said printer video processor, for receiving and processing memory transaction requests from said printer video processor.

2. The computer system of claim 1, wherein said printer video processor includes a register file interconnected to said memory controller, an adder for performing arithmetic operations with data received from said register file to generate addresses and printer control signals, and a video serializer for receiving data from memory and serializing said data for transfer to said printer engine.

3. The computer system of claim 1, wherein said printer video processor cooperatively functions with said instruction processor in generating timing signals, performing scan data fetches and serialization, printer contact, and printer synchronization.

4. The computer system of claim 1, further comprising:
   a plurality of register files;
   first means for routing data from said register files to input ports of said graphical functional units; and
   second means for routing data from output ports of said graphical functional units to said register files.

5. The computer system of claim 1, wherein said first and second means comprise a plurality of multiplexers.

6. The computer system of claim 1, wherein said memory controller comprises a plurality of bidirectional data bus ports.

7. The computer system of claim 1, wherein said memory controller comprises a multi-stage address pipeline.

8. A computer system, comprising:
   a printer engine; and
   a single-chip printer controller, coupled to said printer engine, said printer controller further comprising:
   (1) a printer video processor for generating a plurality of control signals for said printer engine, for generating memory addresses of data to be fetched, for serializing fetched data, and for providing serialized data to said printer engine;
   (2) an instruction processor implemented as a super-scalar microprocessor, comprising:
      (a) one or more graphical functional units, interconnected in said instruction processor as internal functional units to support operation of said printer video processor, comprising at'least one of:
         (i) an orthogonal rotator unit for assembling blocks of orthogonally rotated bit map data, (ii) a bit/byte mirror unit for outputting received data in reverse order, and (iii) a pixel modification unit for modifying pixels in response to graphics instructions; and (b) an instruction scheduler for issuing instructions in parallel to said graphical functional units; and (3) a memory controller, coupled to said printer video processor, for receiving and processing memory transaction requests from said printer video processor.

9. The computer system of claim 8, wherein said printer video processor includes a register file interconnected to said memory controller, an adder for performing arithmetic operations with data received from said register file to generate addresses and printer control signals, and a video serializer for receiving data from memory and serializing said data for transfer to said printer engine.

10. The computer system of claim 8, wherein said printer video processor cooperatively functions with said instruction processor in generating timing signals, performing scan data fetches and serialization, printer contact, and printer synchronization.

11. The computer system of claim 8, further comprising:

a plurality of register files;

first means for routing data from said register files to input ports of said graphical functional units; and second means for routing data from output ports of said graphical functional units to said register files.

12. The computer system of claim 8, wherein said first and second means comprise a plurality of multiplexers.

13. The computer system of claim 8, wherein said memory controller comprises a plurality of bidirectional data bus ports.

14. The computer system of claim 8, wherein said memory controller comprises a multi-stage address pipeline.

* * * * *

UNITED STATES PATENT AND TRADEMARK OFFICE
CERTIFICATE OF CORRECTION

PATENT NO. : 5,564,117

DATED : October 8, 1996

INVENTOR(S): Lentz *et al.*

It is certified that an error appears in the above-identified patent and that said Letters Patent is hereby corrected as shown below.

Title page, and in column 1,
,in the Title, please replace "SUPERCALAR" with --SUPERSCALAR--.

Signed and Sealed this

Twenty-seventh Day of May, 1997

*Attest:*

BRUCE LEHMAN

*Attesting Officer*      *Commissioner of Patents and Trademarks*